(12) United States Patent
Kubota et al.

(10) Patent No.: US 9,939,614 B2
(45) Date of Patent: Apr. 10, 2018

(54) IMAGING LENS FOR FORMING AN IMAGE ON AN IMAGING ELEMENT

(71) Applicants: OPTICAL LOGIC INC., Nagano (JP); KANTATSU CO., LTD., Tochigi (JP)

(72) Inventors: Yoji Kubota, Nagano (JP); Kenichi Kubota, Nagano (JP); Hitoshi Hirano, Nagano (JP); Hisao Fukaya, Tochigi (JP)

(73) Assignees: OPTICAL LOGIC INC., Nagano (JP); KANTATSU CO., LTD., Tochigi (JP)

( * ) Notice: Subject to any disclaimer, the term of this patent is extended or adjusted under 35 U.S.C. 154(b) by 421 days.

(21) Appl. No.: 14/700,211

(22) Filed: Apr. 30, 2015

(65) Prior Publication Data
US 2016/0062081 A1    Mar. 3, 2016

(30) Foreign Application Priority Data

Aug. 27, 2014 (JP) .................. 2014-172366

(51) Int. Cl.
*G02B 13/00* (2006.01)
*G02B 9/62* (2006.01)

(52) U.S. Cl.
CPC ............ *G02B 13/0045* (2013.01); *G02B 9/62* (2013.01)

(58) Field of Classification Search
CPC ........ G02B 27/646; G02B 1/00; G02B 13/04; G02B 13/06; G02B 13/009; G02B 13/00; G02B 13/22; G02B 13/18; G02B 13/02; G02B 13/16; G02B 15/14; G02B 15/16; G02B 15/177; G02B 15/22; G02B 15/161; G02B 15/163; G02B 9/64; G02B 9/62; G02B 9/34; G02B 9/12; G02B 9/04; G02B 9/06; G02B 9/08; G02B 9/60
USPC ........ 359/680–682, 749–753, 791, 784, 780, 359/779, 772, 771, 769, 768, 767, 764, 359/763, 760, 754, 748, 689, 686, 685, 359/683, 713, 756, 757, 759
See application file for complete search history.

(56) References Cited

U.S. PATENT DOCUMENTS

2015/0049393 A1* 2/2015 Park, II .............. G02B 13/0045
                                                          359/713

FOREIGN PATENT DOCUMENTS

JP        2013-195587 A    9/2013

* cited by examiner

*Primary Examiner* — William R Alexander
*Assistant Examiner* — Henry Duong
(74) *Attorney, Agent, or Firm* — Kubotera & Associates, LLC

(57) ABSTRACT

An imaging lens includes a first lens group having positive refractive power; and a second lens group having negative refractive power, arranged in this order from an object side to an image plane side. The first lens group includes a first lens having positive refractive power, a second lens having positive refractive power, and a third lens having negative refractive power. The second lens group includes a fourth lens having negative refractive power, a fifth lens having negative refractive power, and a sixth lens having positive refractive power. The first lens group has a specific focal length, and the first to third lenses have specific Abbe's numbers so that the specific conditional expressions are satisfied.

6 Claims, 18 Drawing Sheets

IMAGING LENS FOR FORMING AN IMAGE ON AN IMAGING ELEMENT

BACKGROUND OF THE INVENTION AND RELATED ART STATEMENT

The present invention relates to an imaging lens for forming an image of an object on an imaging element such as a CCD sensor and a CMOS sensor. In particular, the present invention relates to an imaging lens suitable for mounting in a relatively small camera such as a camera to be built in a portable device like a cellular phone and a portable information terminal, a digital still camera, a security camera, a vehicle onboard camera, and a network camera.

In these years, in place of cellular phones that are intended mainly for making phone calls, so-called "smartphones", i.e., multifunctional cellular phones which can run various application software as well as a voice call function, have been more widely used. When application software is run on smartphones, it is possible to achieve functions such as those of digital still cameras and car navigation systems on the smartphones. In order to achieve those various functions, most models of smartphones include cameras similarly to cellular phones.

Generally speaking, product groups of such smartphones are often composed according to specifications for beginners to advanced users. Among them, an imaging lens to be mounted in a product designed for the advanced users is required to have a high-resolution lens configuration so as to be also applicable to a high pixel count imaging element of these years, as well as a small size.

As a method of attaining the high-resolution imaging lens, there has been a method of increasing the number of lenses that compose the imaging lens. However, the increase of the number of lenses easily causes an increase in the size of the imaging lens, and is a disadvantageous for mounting in a small-sized camera such as the above-described smartphones. For this reason, for developing an imaging lens, it has been conventionally typical to focus on shortening a total track length, while attaining higher resolution of the imaging lens.

With rapid advancement in achieving the higher pixel count of an imaging element and image processing technology in these days, an imaging lens has been developed so as to attain higher resolution rather than a shorter total track length of the imaging lens. For example, conventionally, it has been typical to mount a camera unit, which includes an imaging lens and an imaging element, in the smartphone. There has also been an attempt to attach a separate camera unit onto a smartphone, whereby it is possible to obtain images equivalent to those taken by digital still cameras. In other words, space restriction upon mounting a camera in a smartphone is solved by configuring a camera separately from the smartphone.

In case of a lens configuration composed of six lenses, due to the large number of lenses of the imaging lens, it is somewhat difficult to reduce the size of the imaging lens. However, because of high flexibility in design, it has potential to attain satisfactory correction of aberrations and downsizing, which are necessary for high-resolution imaging lenses, in a balanced manner. For example, as the imaging lens having the six-lens configuration as described above, an imaging lens described in Patent Reference has been known.

Patent Reference: Japanese Patent Application Publication No. 2013-195587

The imaging lens described in Patent Reference includes a first lens that is positive and directs a convex surface thereof to an object side, a second lens that is negative and directs a concave surface thereof to an image plane side, a third lens that is negative and directs a concave surface thereof to the object side, a fourth and fifth lenses that are positive and direct convex surfaces thereof to the image plane side, and a sixth lens that is negative and directs a concave surface thereof to the object side. According to the conventional imaging lens of Patent Reference, by satisfying conditional expressions of a ratio between a focal length of the first lens and a focal length of the third lens and a ratio between a focal length of the second lens and a focal length of the whole lens system, it is achievable to satisfactorily correct a distortion and a chromatic aberration.

Each year, functions and sizes of cellular phones and smartphones are getting higher and smaller, and the level of a small size required for an imaging lens is even higher than before. In case of the imaging lens of Patent Reference, since a distance from an object-side surface of a first lens to an image plane of an imaging element is long, there is a limit by itself to achieve satisfactory correction of aberrations while downsizing the imaging lens to satisfy the above-described demands. It is achievable to reduce the level of downsizing required for an imaging lens by providing a camera as a separate unit from cellular phones or smartphones. However, in terms of convenience or portability, cellular phones or smartphones with built-in cameras are still dominantly preferred. Therefore, there remains such a strong demand for small imaging lenses with high resolution.

Here, such a problem is not specific to the imaging lens to be mounted in cellular phones and smartphones. Rather, it is a common problem even for an imaging lens to be mounted in a relatively small camera such as digital still cameras, portable information terminals, security cameras, vehicle onboard cameras, and network cameras.

In view of the above-described problems in the conventional techniques, an object of the present invention is to provide an imaging lens that can attain both downsizing thereof and satisfactory aberration correction.

Further objects and advantages of the present invention will be apparent from the following description of the invention.

SUMMARY OF THE INVENTION

In order to attain the objects described above, according to a first aspect of the present invention, an imaging lens includes a first lens group having positive refractive power; and a second lens group having negative refractive power, arranged in the order from an object side to an image plane side. The first lens group includes a first lens having positive refractive power, a second lens having positive refractive power, and a third lens having negative refractive power. The second lens group includes a fourth lens having negative refractive power, a fifth lens having negative refractive power, and a sixth lens having positive refractive power.

According to the first aspect of the present invention, when the whole lens system has a focal length f, the first lens group has a focal length F1, the first lens has an Abbe's number vd1, the second lens has an Abbe's number vd2, and the third lens has an Abbe's number vd3, the imaging lens of the present invention satisfies the following conditional expressions (1) to (4):

$$0.6 < F1/f < 1.4 \tag{1}$$

$$40 < vd1 < 75 \tag{2}$$

$$40<vd2<75 \quad (3)$$

$$15<vd3<35 \quad (4)$$

According to the first aspect of the present invention, the first lens group is composed of three lenses, whose refractive powers are arranged in the order of positive-positive-negative. Those three lenses are respectively made of lens materials that satisfy the conditional expressions (2) through (4), and the first and the second lenses and the third lens are a combination of low dispersion materials and a high dispersion material. With such arrangement of refractive powers and the order of Abbe's numbers of those lenses, in the first lens group, it is achievable to suitably restrain generation of chromatic aberration and satisfactorily correct the chromatic aberration, if generated.

According to the first aspect of the present invention, positive refractive power is shared between the two lenses, the first lens and the second lens. Therefore, it is achievable to restrain the refractive powers of the first lens and the second lens to be relatively weak, and it is achievable to suitably downsize the imaging lens while satisfactorily correcting aberrations.

When the imaging lens satisfies the conditional expression (1), it is also achievable to restrain a chromatic aberration, an astigmatism, and a field curvature respectively within preferred ranges in a balanced manner, while downsizing the imaging lens. When the value exceeds the upper limit of "1.4", the first lens group has weak refractive power relative to that of the whole lens system. Accordingly, the back focal length is long and it is difficult to downsize the imaging lens. As for the chromatic aberration, although it is advantageous for correction of an axial chromatic aberration, a chromatic aberration of magnification is insufficiently corrected (an image-forming point at a short wavelength moves in a direction to be close to an optical axis relative to an image-forming point at a reference wavelength). Moreover, an image-forming surface curves to the image plane side, i.e., the field curvature is excessively corrected, and an astigmatic difference increases, so that it is difficult to obtain satisfactory image-forming performance.

On the other hand, when the value is below the lower limit of "0.6", the first lens group has strong refractive power relative to that of the whole lens system, so that it is advantageous for downsizing of the imaging lens. However, the axial chromatic aberration is insufficiently corrected (a focal position at a short wavelength moves in a direct to be close to the object side relative to a focal position at a reference wavelength). In addition, among the astigmatism, a sagittal image surface tilts towards the object side and the astigmatism increases. Therefore, it is difficult to obtain satisfactory image-forming performance.

According to a second aspect of the present invention, when the first lens has a focal length f1, and the second lens has a focal length f2, the imaging lens having the above-described configuration preferably satisfies the following conditional expression (5):

$$0.5<f1/f2<5.0 \quad (5)$$

When the imaging lens satisfies the conditional expression (5), it is achievable to satisfactorily correct the chromatic aberration, the astigmatism, and the field curvature.

When the value exceeds the upper limit of "5.0" in the conditional expression (5), the first lens has weak refractive power relative to that of the second lens. Therefore, although it is advantageous for securing the back focal length, it is difficult to downsize the imaging lens. Moreover, among the astigmatism, the sagittal image surface tilts towards the image plane side and the astigmatism increases, so that it is difficult to obtain satisfactory image-forming performance.

On the other hand, when the value is below the lower limit of "0.5", the first lens has strong refractive power relative to that of the second lens, so that it is advantageous for downsizing of the imaging lens. However, the back focal length is short, and it is difficult to secure a space to dispose an insert such as an infrared filter. In addition, among the astigmatism, the sagittal image surface tilts towards the object side and the astigmatism increases, s that it is difficult to obtain satisfactory image-forming performance.

According to a third aspect of the present invention, when the third lens has a focal length f3, the imaging lens having the above-described configuration preferably satisfies the following conditional expression (6):

$$-3.5<f3/F1<-0.5 \quad (6)$$

When the imaging lens satisfies the conditional expression (6), it is possible to satisfactorily correct the chromatic aberration and the astigmatism. When the value exceeds the upper limit of "−0.5", the third lens has relatively strong negative refractive power in the first lens group. Therefore, the astigmatism increases towards the image plane side, and the chromatic aberration of magnification of an off-axis light flux is excessively corrected (an image-forming point at a short wavelength moves in a direction to be away from the optical axis relative to an image-forming point at a reference wavelength). For this reason, it is difficult to obtain satisfactory image-forming performance.

On the other hand, when the value is below the lower limit of "−3.5", although it is easier to correct the astigmatism, since the axial chromatic aberration increases, it is difficult to obtain satisfactory image-forming performance.

According to a fourth aspect of the present invention, when a distance on the optical axis between the first lens and the second lens is D12 and a distance on the optical axis between the second lens and the third lens is D23, the imaging lens having the above-described configuration preferably satisfies the following conditional expression (7):

$$3<D12/D23<8 \quad (7)$$

When the imaging lens satisfies the conditional expression (7), it is achievable to restrain the field curvature and the distortion within satisfactory ranges, while downsizing of the imaging lens. When the value exceeds the upper limit of "8", although it is advantageous for downsizing of the imaging lens, it is difficult to secure the back focal length. Among the astigmatism, the tangential image surface tilts towards the image plane side, so that the field curvature is excessively corrected. Moreover, the distortion increases in a plus direction, so that it is difficult to obtain satisfactory image-forming performance.

On the other hand, when the value is below the lower limit of "3", although it is advantageous for securing the back focal length, it is difficult to downsize the imaging lens. Moreover, among the astigmatism, the sagittal image surface tilts towards the object side, and it is difficult to obtain satisfactory image-forming performance.

According to a fifth aspect of the present invention, when a composite focal length of the fourth lens and the fifth lens is f45, the imaging lens having the above-described configuration preferably satisfies the following conditional expression (8):

$$-7.0<f45/f<-0.5 \quad (8)$$

When the imaging lens satisfies the conditional expression (8), it is achievable to satisfactorily correct the chromatic aberration and the astigmatism. When the value exceeds the upper limit of "−0.5", the negative refractive power of the fourth lens and the fifth lens is strong relative to the refractive power of the whole lens system. Therefore, the positive refractive power of the sixth lens is relatively strong in the second lens group. For this reason, the off-axis chromatic aberration of magnification is insufficiently corrected and the astigmatism increases. Therefore it is difficult to obtain satisfactory image-forming performance.

On the other hand, when the value is below the lower limit of "−7.0", the negative refractive power of the fourth lens and the fifth lens is weak relative to the refractive power of the whole lens system. Therefore, although it is easy to correct the chromatic aberration, the astigmatic difference increases, so that it is difficult to obtain satisfactory image-forming performance.

According to a sixth aspect of the present invention, when the sixth lens has a focal length f6, the imaging lens having the above-described configuration preferably satisfies the following conditional expression (9):

$$2 < f6/f < 10 \qquad (9)$$

When the imaging lens satisfies the conditional expression (9), it is achievable to restrain the astigmatism and the chromatic aberration of magnification within preferred ranges. When the value exceeds the upper limit of "10", the sixth lens has weak refractive power relative to that of the whole lens system. Therefore, among the astigmatism, the tangential image surface tilts towards the image plane side, and the astigmatic difference increases, so that it is difficult to obtain satisfactory image-forming performance.

On the other hand, when the value is below the lower limit of "2", the sixth lens has strong refractive power relative to that of the whole lens system. Therefore, the chromatic aberration of magnification of an off-axis light flux increases. In addition, among the astigmatism, the tangential image surface tilts to the object side and the astigmatic difference increases, so that it is difficult to obtain satisfactory image-forming performance.

According to a seventh aspect of the present invention, when a composite focal length of the fourth lens and the fifth lens is f45 and the sixth lens has a focal length f6, the imaging lens having the above-described configuration preferably satisfies the following conditional expression (10):

$$-0.8 < f45/f6 < -0.1 \qquad (10)$$

When the imaging lens satisfies the conditional expression (10), it is achievable to satisfactorily correct the distortion, the field curvature, and the chromatic aberration in a balanced manner, while downsizing of the imaging lens. When the value exceeds the upper limit of "−0.1", the negative refractive power of the fourth lens and the fifth lens is strong relative to the positive refractive power of the sixth lens. Therefore, although it is advantageous for downsizing of the imaging lens, it is difficult to secure the back focal length. In addition, a plus distortion increases and the image-forming surface curves to the object side, i.e. the field curvature is insufficiently corrected, so that it is difficult to obtain satisfactory image-forming performance.

On the other hand, when the value is below the lower limit of "−0.8", the negative refractive power of the fourth lens and the fifth lens is weak relative to the positive refractive power of the sixth lens. Therefore, although it is easy to secure the back focal length, it is difficult to downsize the imaging lens. Moreover, the chromatic aberration of magnification of an off-axis light flux is insufficiently corrected, so that it is difficult to obtain satisfactory image-forming performance.

According to an eighth aspect of the present invention, when a curvature radius of a surface of the sixth lens on the image plane side is R6r, the imaging lens having the above-described configuration preferably satisfies the following conditional expression (11):

$$0.3 < R6r/f < 1.2 \qquad (11)$$

When the imaging lens satisfies the conditional expression (11), it is achievable to satisfactorily restrain the distortion, the chromatic aberration of magnification, and the astigmatism within satisfactory ranges. When the value exceeds the upper limit of "1.2", the chromatic aberration of magnification of an off-axis light flux increases, so that it is difficult to obtain satisfactory image-forming performance.

On the other hand, when the value is below the lower limit of "0.3", a minus distortion increases, and among the astigmatism, the sagittal image surface tilts towards the object side and the astigmatic difference increases. Moreover, the chromatic aberration of magnification of an off-axis light flux is insufficiently corrected, and it is difficult to obtain satisfactory image-forming performance.

Here, according to the invention, whether a curvature radius is positive or negative is determined by common definition. More specifically, having a traveling direction of light as positive, when a curvature center is on the side of the image plane when viewed from a lens surface, the curvature radius is positive. On the other hand, when the curvature center is on the object side, the curvature radius is negative.

According to a ninth aspect of the present invention, in order to further downsize the imaging lens, when the sixth lens has an Abbe's number vd6, the imaging lens having the above-described configuration preferably satisfies the following conditional expression (12):

$$15 < vd6 < 35 \qquad (12)$$

According to the imaging lens of the present invention, it is possible to provide a small-sized imaging lens that is especially suitable for mounting in a small-sized camera, while having high resolution with satisfactory correction of aberrations.

DETAILED DESCRIPTION OF PREFERRED EMBODIMENTS

Hereunder, referring to the accompanying drawings, an embodiment of the present invention will be fully described.

FIGS. 1, 4, 7, 10, 13, and 16 are schematic sectional views of the imaging lenses in Numerical Data Examples 1 to 6 according to the embodiment, respectively. Since the imaging lenses in those Numerical Data Examples have the same basic lens configuration, the lens configuration of the embodiment will be described with reference to the illustrative sectional view of Numerical Data Example 1.

Figure 1:
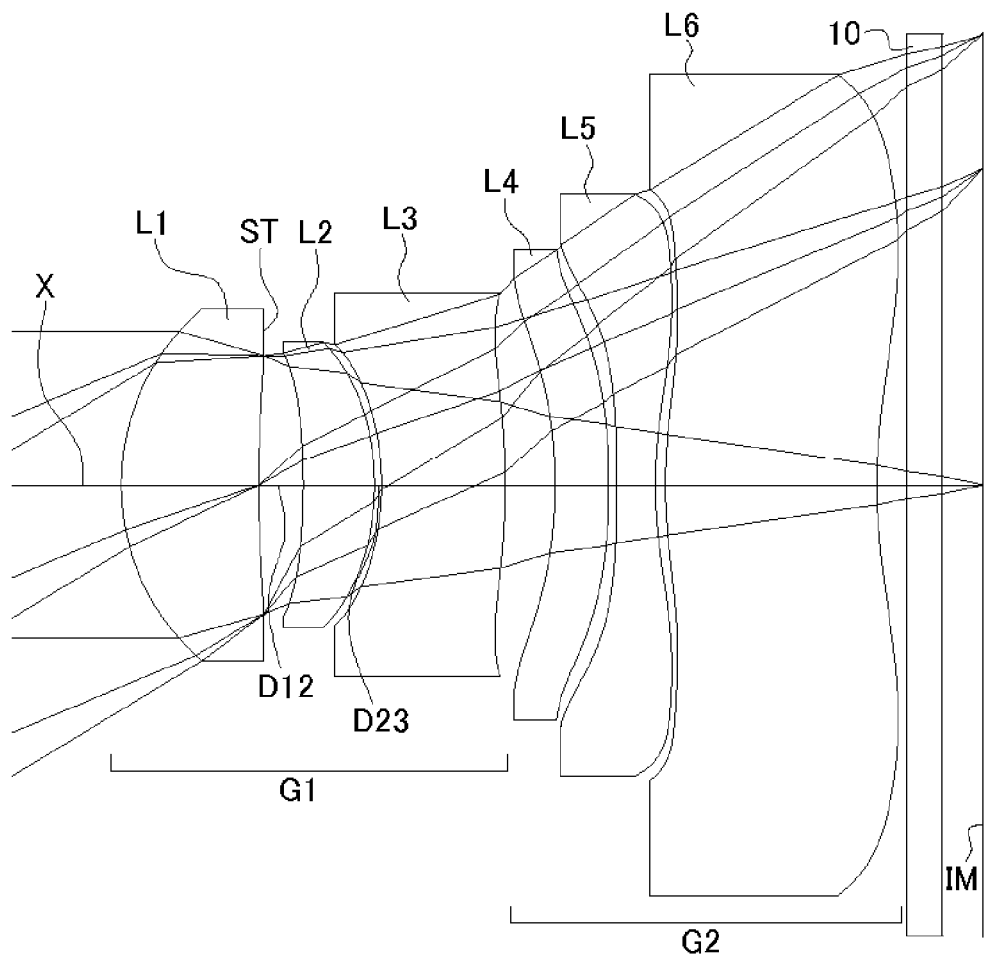
FIG. 1 shows a sectional view of a schematic configuration of an imaging lens in Numerical Data Example 1 according to an embodiment of the present invention.

As shown in FIG. 1, according to the embodiment, the imaging lens includes a first lens group G1 having positive refractive power, and a second lens group G2 having negative refractive power, arranged in the order from an object side to an image plane side. Between the second lens group G2 and an image plane IM of an imaging element, there is provided a filter 10. The filter 10 is omissible.

The first lens group G1 includes a first lens L1 having positive refractive power, an aperture stop ST, a second lens L2 having positive refractive power, and a third lens L3 having negative refractive power, arranged in the order from the object side. According to the imaging lens of the embodiment, the aperture stop ST is provided on an image plane-side surface of the first lens L1. Here, the position of the aperture stop ST is not limited to be between the first lens L1 and the second lens L2 as in the imaging lens of Numerical Data Example 1. For example, it is also possible to dispose the aperture stop ST on the object side of the first lens L1. In case of a so-called "front aperture"-type lens configuration, in which the aperture stop ST is disposed on the object side of the imaging lens, it is achievable to improve the ease of lens assembly and reduce the manufacturing cost. In case of the front aperture-type lens configuration, since it is also relatively easy to shorten a total track length of the imaging lens, the lens configuration is also effective for mounting in a portable device such as cellular phones and smartphones that are popular in these years.

On the other hand, in case of a so-called "mid aperture"-type lens configuration, in which the aperture stop ST is disposed between the first lens L1 and the second lens L2 as in Numerical Data Example 1, an effective diameter of the first lens L1 is large relative to the total track length of the imaging lens. Therefore, the presence of the imaging lens in a camera is emphasized, and it is possible to appeal to users by the luxurious impression, high lens performance, etc. as a part of design of the camera.

In the first lens group G1, the first lens L1 is formed in a shape such that a curvature radius r1 of an object-side surface thereof and a curvature radius r2 of an image plane-side surface thereof are both positive, so as to have a shape of a meniscus lens directing a convex surface thereof to the object side near an optical axis X. The shape of the first lens L1 is not limited to the one in Numerical Data Example 1. The first lens L1 can be formed in any shape, as long as the curvature radius r1 of the object-side surface thereof is positive. More specifically, the first lens L1 can also be formed in a shape such that the curvature radius r2 is negative so as to have a shape of a biconvex lens near the optical axis X.

The second lens L2 is formed in a shape such that a curvature radius r3 of an object-side surface thereof and a curvature radius r4 of an image plane-side surface thereof are both negative, so as to have a shape of a meniscus lens directing a concave surface thereof to the object side near the optical axis X. The shape of the second lens L2 is not limited to the one in Numerical Data Example 1, and can be any as long as the curvature radius r4 of the image plane-side surface thereof is negative. Numerical Data Examples 2, 4, and 5 are examples, in which the second lens L2 is formed in a shape such that a curvature radius r3 is positive, so as to have a shape of a biconvex lens near the optical axis X.

The third lens L3 is formed in a shape such that a curvature radius r5 of an object-side surface thereof and a curvature radius r6 of an image plane-side surface thereof are both negative, so as to have a shape of a meniscus lens directing a concave surface thereof to the object side near the optical axis X. The shape of the third lens L3 is not limited to the one in Numerical Data Example 1. Numerical Data Examples 2 and 6 are examples, in which the third lens L3 is formed in a shape such that the curvature radius r5 is negative and the curvature radius r6 is positive, so as to have a shape of a biconcave lens near the optical axis X. Numerical Data Example 4 is an example, in which the third lens L3 is formed in a shape such that the curvature radius r5 and the curvature radius r6 are both positive, so as to have a shape of a meniscus lens directing a convex surface thereof to the object side near the optical axis X.

The second lens group G2 includes the fourth lens L4 having negative refractive power, the fifth lens L5 having negative refractive power, and the sixth lens L6 having positive refractive power, arranged in the order from the object side.

In the second lens group G2, the fourth lens L4 is formed in a shape such that a curvature radius r7 of an object-side surface thereof and a curvature radius r8 of an image plane-side surface thereof are both negative, so as to have a shape of a meniscus lens directing a concave surface thereof to the object side near the optical axis X. The shape of the fourth lens L4 is not limited to the one in Numerical Data Example 1. Numerical Data Example 3 is an example, in which the fourth lens L4 is formed in shape such that the curvature radius r7 is negative and the curvature radius r8 is positive, so as to have a shape of a biconcave lens near the optical axis X. Numerical Examples 5 and 6 are examples, in which the curvature radius r7 and the curvature radius r8 are both positive, so as to have a shape of a meniscus lens directing a convex surface thereof to the object side near the optical axis X.

The fifth lens L5 is formed in a shape such that a curvature radius r9 of an object-side surface thereof is negative and a curvature radius r10 of an image plane-side surface thereof is positive, so as to have a shape of a biconcave lens near the optical axis X. The shape of the fifth lens L5 is not limited to the one in Numerical Data Example 1. Numerical Data Examples 2 to 6 are examples, in which the curvature radius r9 and the curvature radius r10 are both positive, so as to have a shape of a meniscus lens directing a convex surface thereof to the object side near the optical axis X.

The sixth lens L6 is formed in a shape such that a curvature radius r11 of an object-side surface thereof and a curvature radius r12 of an image plane-side surface thereof are both positive, so as to have a shape of a meniscus lens directing a convex surface thereof to the object side near the optical axis X. In the sixth lens L6, the object-side surface thereof and the image plane-side surface thereof formed as aspheric surfaces having inflexion points. With such a shape of the sixth lens L6, it is achievable to satisfactorily correct not only the axial chromatic aberration but also the off-axis chromatic aberration of magnification. In addition, it is achievable to suitably restrain an incident angle of a light beam emitted from the imaging lens to the image plane IM within a range of a chief ray angle (CRA).

According to the embodiment, the imaging lens satisfies the following conditional expressions (1) to (11):

$$0.6 < F1/f < 1.4 \quad (1)$$

$$40 < vd1 < 75 \quad (2)$$

$$40 < vd2 < 75 \quad (3)$$

$$15 < vd3 < 35 \quad (4)$$

$$0.5 < f1/f2 < 5.0 \quad (5)$$

$$-3.5 < f3/F1 < -0.5 \quad (6)$$

$$3 < D12/D23 < 8 \quad (7)$$

$$-7.0 < f45/f < -0.5 \quad (8)$$

$$2 < f6/f < 10 \quad (9)$$

$$-0.8 < f45/f6 < -0.1 \quad (10)$$

$$0.3 < R6r/f < 1.2 \quad (11)$$

In the above conditional expressions:
f: Focal length of the whole lens system
F1: Focal length of the first lens group G1
f1: Focal length of the first lens L1
f2: Focal length of the second lens L2
f3: Focal length of the third lens L3
f6: Focal length of the sixth lens L6
f45: Composite focal length of the fourth lens L4 and the fifth lens L5
D12: Distance on the optical axis X between the first lens L1 and the second lens L2
D23: Distance on the optical axis X between the second lens L2 and the third lens L3
vd1: Abbe's number of the first lens L1
vd2: Abbe's number of the second lens L2
vd3: Abbe's number of the third lens L3
R6r: Curvature radius of an image plane-side surface of the sixth lens L6

Furthermore, according to Numerical Data Examples 1 through 5 of the embodiment, the imaging lens satisfies the following conditional expression (12):

$$15 < vd6 < 35 \quad (12)$$

In the above conditional expression,
vd6: Abbe's number of the sixth lens L6

According to the imaging lens of the embodiment, in case of setting priority on downsizing of the imaging lens, based on results of optical simulations, it is known that it is more achievable in terms of designing if the imaging lens satisfies the conditional expression (12). This is because that, according to the imaging lens of the embodiment, the fourth lens L4 and the fifth lens L5 have negative refractive powers, so that it is easier to correct aberrations, especially chromatic aberration, if the sixth lens L6 having positive refractive power is made of a high-dispersion material.

Here, it is not necessary to satisfy all of the conditional expressions, and it is achievable to obtain an effect corresponding to the respective conditional expression when any single one of the conditional expressions is individually satisfied.

In the embodiment, all lens surfaces are formed as an aspheric surface. When the aspheric shapes applied to the lens surfaces have an axis Z in a direction of the optical axis X, a height H in a direction perpendicular to the optical axis X, a conic constant k, and aspheric coefficients $A_4$, $A_6$, $A_8$, $A_{10}$, $A_{12}$, $A_{14}$, and $A_{16}$, the aspheric shapes of the lens surfaces are expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

[Formula 1]

Next, Numerical Data Examples of the imaging lens of the embodiment will be described. In each Numerical Data Example, f represents a focal length of the whole lens system, Fno represents an F-number, and ω represents a half angle of view, respectively. In addition, i represents a surface number counted from the object side, r represents a curvature radius, d represents a distance on the optical axis between lens surfaces (surface spacing), nd represents a refractive index, and vd represents an Abbe's number, respectively. Here, aspheric surfaces are indicated with surface numbers i affixed with * (asterisk).

NUMERICAL DATA EXAMPLE 1

Basic data are shown below.
f = 4.89 mm, Fno = 2.4, ω = 31.5°
Unit: mm
Surface Data

| Surface Number i | r | d | nd | vd |
|---|---|---|---|---|
| (Object) | ∞ | ∞ | | |
| 1* | 1.574 | 0.912 | 1.5346 | 56.1(=vd1) |
| 2*(Stop) | 10.826 | 0.295 (=D12) | | |
| 3* | −4.771 | 0.473 | 1.5346 | 56.1(=vd2) |
| 4* | −1.685 | 0.048 (=D23) | | |
| 5* | −1.795 | 0.816 | 1.6355 | 23.9(=vd3) |
| 6* | −5.058 | 0.331 | | |
| 7* | −3.211 | 0.357 | 1.5346 | 56.1(=vd4) |
| 8* | −4.669 | 0.054 | | |
| 9* | −12.945 | 0.256 | 1.5346 | 56.1(=vd5) |
| 10* | 2.882 | 0.066 | | |
| 11* | 3.249 | 1.400 | 1.6142 | 26.0(=vd6) |

-continued

| | | | | |
|---|---|---|---|---|
| 12* | 3.662 (=R6r) | 0.200 | | |
| 13 | ∞ | 0.238 | 1.5168 | 64.2 |
| 14 (Image plane) | ∞ ∞ | 0.263 | | |

Aspheric Surface Data

First Surface
$k = 0.000, A_4 = 9.198E{-}03, A_6 = -6.154E{-}03, A_8 = -3.882E{-}03, A_{10} = 2.628E{-}02, A_{12} = -2.072E{-}02, A_{14} = 3.650E{-}03, A_{16} = 2.137E{-}04$
Second Surface
$k = 0.000, A_4 = 1.547E{-}02, A_6 = -1.957E{-}02, A_8 = 1.607E{-}02, A_{10} = -3.709E{-}02, A_{12} = 6.649E{-}03, A_{14} = 3.695E{-}03, A_{16} = 1.587E{-}02$
Third Surface
$k = 0.000, A_4 = -5.861E{-}02, A_6 = 1.589E{-}01, A_8 = -5.613E{-}01, A_{10} = 5.298E{-}01, A_{12} = -5.491E{-}02, A_{14} = -8.742E{-}02, A_{16} = -6.561E{-}02$
Fourth Surface
$k = 0.000, A_4 = -7.337E{-}04, A_6 = -9.644E{-}02, A_8 = 9.046E{-}02, A_{10} = -6.969E{-}02, A_{12} = 4.672E{-}02, A_{14} = -1.785E{-}03, A_{16} = -5.654E{-}02$
Fifth Surface
$k = 0.000, A_4 = -1.408E{-}02, A_6 = -6.729E{-}02, A_8 = 1.273E{-}01, A_{10} = -1.282E{-}01, A_{12} = -1.172E{-}02, A_{14} = 1.591E{-}01, A_{16} = -1.749E{-}01$
Sixth Surface
$k = 0.000, A_4 = 2.366E{-}03, A_6 = 2.186E{-}02, A_8 = -3.262E{-}03, A_{10} = 2.157E{-}02, A_{12} = -7.062E{-}03, A_{14} = -6.923E{-}03, A_{16} = 3.009E{-}03$
Seventh Surface
$k = 0.000, A_4 = -1.925E{-}02, A_6 = -7.628E{-}03, A_8 = 1.018E{-}02, A_{10} = 7.098E{-}03, A_{12} = -2.338E{-}03, A_{14} = -5.498E{-}04, A_{16} = 7.686E{-}05$
Eighth Surface
$k = 0.000, A_4 = -4.767E{-}02, A_6 = 6.429E{-}03, A_8 = -2.408E{-}03, A_{10} = 1.420E{-}03, A_{12} = 8.694E{-}04, A_{14} = 1.406E{-}04, A_{16} = -1.457E{-}04$
Ninth Surface
$k = 0.000, A_4 = -5.522E{-}02, A_6 = -1.534E{-}02, A_8 = 2.429E{-}03, A_{10} = 3.614E{-}03, A_{12} = -1.818E{-}04, A_{14} = -1.730E{-}04, A_{16} = 1.290E{-}05$
Tenth Surface
$k = 0.000, A_4 = -8.640E{-}02, A_6 = 5.682E{-}03, A_8 = 2.436E{-}03, A_{10} = 4.996E{-}05, A_{12} = -5.492E{-}05, A_{14} = -2.328E{-}05, A_{16} = -2.479E{-}06$
Eleventh Surface
$k = 0.000, A_4 = -9.980E{-}02, A_6 = 1.842E{-}02, A_8 = 5.236E{-}04, A_{10} = -2.064E{-}04, A_{12} = -3.175E{-}05, A_{14} = -9.304E{-}06, A_{16} = -1.065E{-}06$
Twelfth Surface
$k = 0.000, A_4 = -4.166E{-}02, A_6 = 2.987E{-}03, A_8 = -4.374E{-}05, A_{10} = 1.386E{-}05, A_{12} = -1.728E{-}06, A_{14} = -4.773E{-}07, A_{16} = 3.362E{-}08$
f1 = 3.33 mm
f2 = 4.63 mm
f3 = -4.85 mm
f4 = -21.03 mm
f5 = -4.38 mm
f6 = 20.49 mm
f45 = -3.49 mm
F1 = 3.71 mm
The values of the respective conditional expressions are as follows:
F1/f = 0.76
f1/f2 = 0.72
f3/F1 = -1.31
D12/D23 = 6.15
f45/f = -0.71
f6/f = 4.19
f45/f6 = -0.17
R6r/f = 0.75

Accordingly, the imaging lens of Numerical Data Example 1 satisfies the above-described conditional expressions. The distance on the optical axis X from the object-side surface of the first lens L1 to the image plane IM (air conversion length for the filter 10) is 5.63 mm, and downsizing of the imaging lens is attained.

Figure 2:
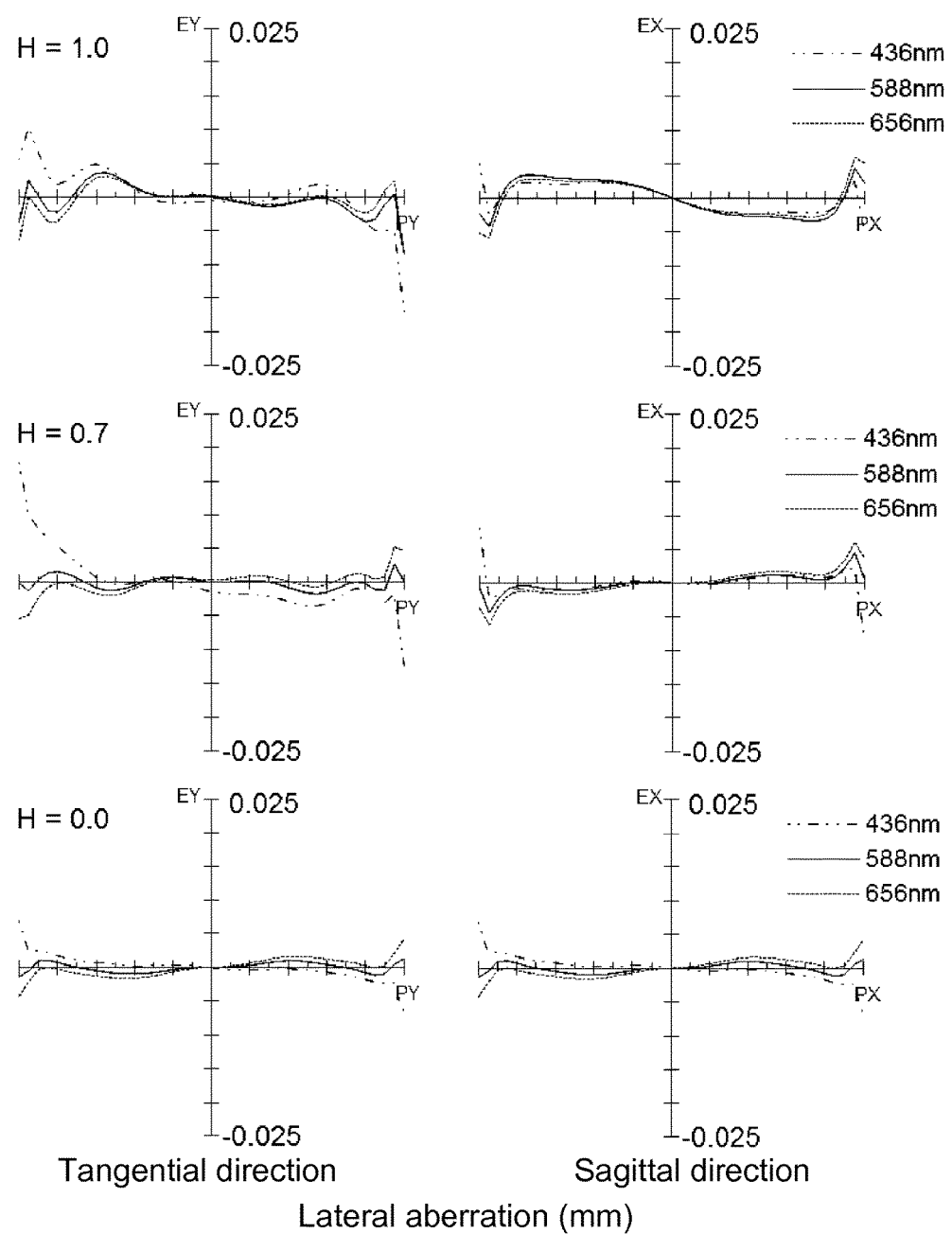
FIG. 2 is an aberration diagram showing a lateral aberration of the imaging lens of FIG. 1.
Figure 3:
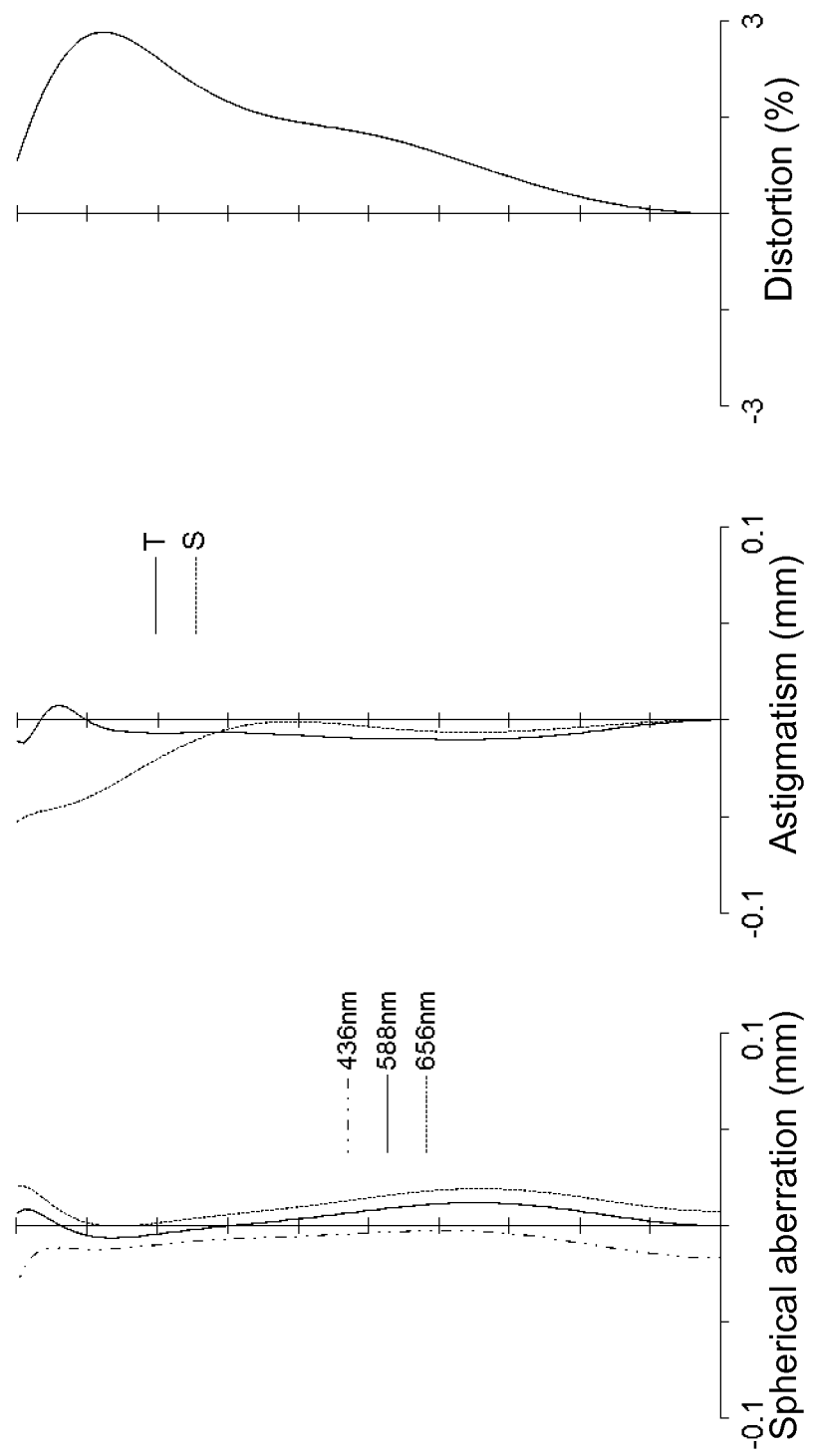
FIG. 3 is an aberration diagram showing a spherical aberration, astigmatism, and a distortion of the imaging lens of FIG. 1.
Figure 4:
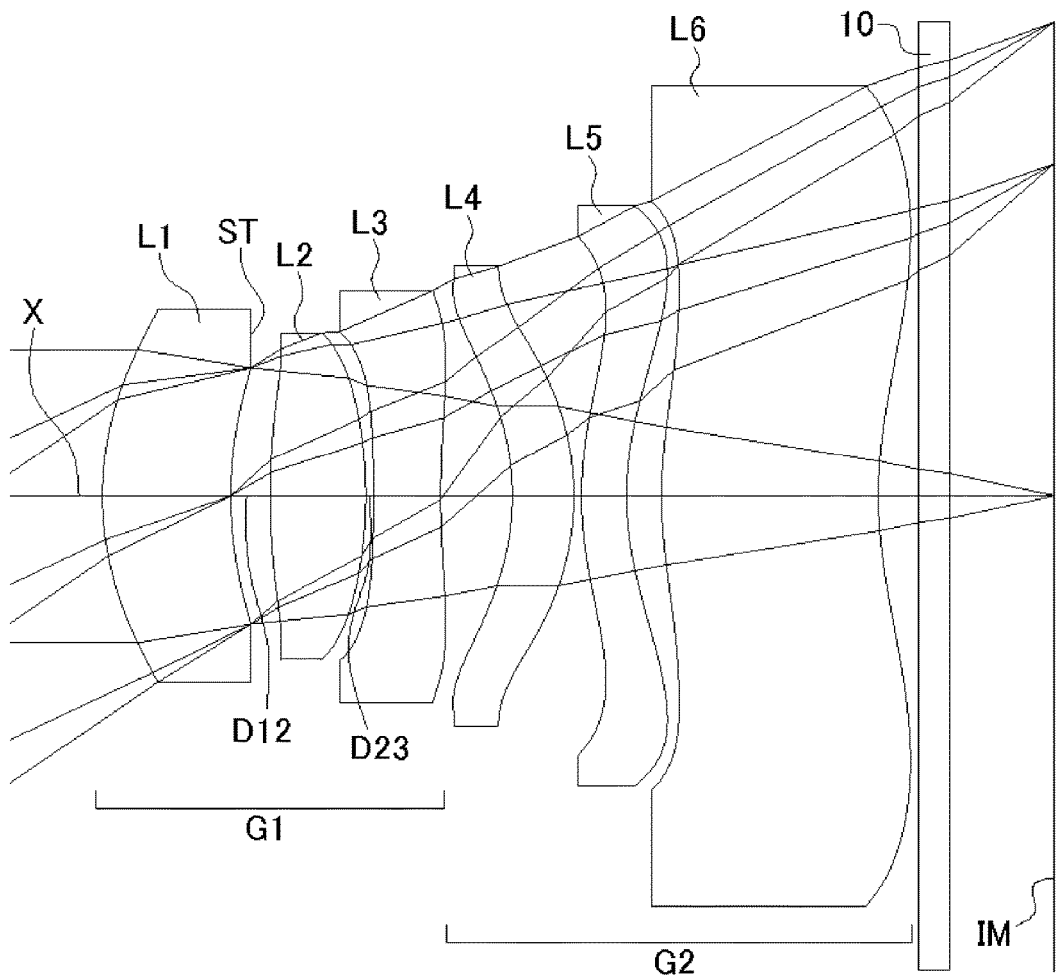
FIG. 4 shows a sectional view of a schematic configuration of an imaging lens in Numerical Data Example 2 according to the embodiment of the present invention.

FIG. 2 shows a lateral aberration that corresponds to a ratio H of each image height to the maximum image height (hereinafter referred to as "image height ratio H"), which is divided into a tangential direction and a sagittal direction (The same is true for FIGS. 5, 8, 11, 14, and 17). Furthermore, FIG. 3 shows a spherical aberration (mm), astigmatism (mm), and a distortion (%), respectively. In the astigmatism diagram, an aberration on a sagittal image surface S and an aberration on a tangential image surface T are respectively indicated (The same is true for FIGS. 6, 9, 12, 15, and 18). As shown in FIGS. 2 and 3, according to the imaging lens of Numerical Data Example 1, the aberrations are satisfactorily corrected.

NUMERICAL DATA EXAMPLE 2

Basic data are shown below.
f = 4.45 mm, Fno = 2.4, ω = 34.0°
Unit: mm
Surface Data

| Surface Number i | r | d | nd | vd |
|---|---|---|---|---|
| (Object) | ∞ | ∞ | | |
| 1* | 1.984 | 0.813 | 1.5346 | 56.1(=vd1) |
| 2*(Stop) | 2.544 | 0.250(=D12) | | |
| 3* | 4.699 | 0.601 | 1.5346 | 56.1(=vd2) |
| 4* | -2.840 | 0.050(=D23) | | |
| 5* | -11.048 | 0.424 | 1.6355 | 23.9(=vd3) |
| 6* | 5.683 | 0.453 | | |
| 7* | -1.587 | 0.390 | 1.5346 | 56.1(=vd4) |
| 8* | -1.781 | 0.049 | | |
| 9* | 2.374 | 0.283 | 1.5346 | 56.1(=vd5) |
| 10* | 1.938 | 0.222 | | |
| 11* | 2.837 | 1.371 | 1.6142 | 26.0(=vd6) |
| 12* | 2.773 (=R6r) | 0.250 | | |
| 13 | ∞ | 0.200 | 1.5168 | 64.2 |
| 14 (Image plane) | ∞ | 0.656 | | |

Aspheric Surface Data

First Surface
$k = 0.000, A_4 = -4.562E{-}03, A_6 = -5.283E{-}03, A_8 = -6.019E{-}03, A_{10} = 1.512E{-}02, A_{12} = -2.132E{-}02, A_{14} = 1.176E{-}02, A_{16} = -2.562E{-}03$
Second Surface
$k = 0.000, A_4 = 7.151E{-}03, A_6 = -2.590E{-}02, A_8 = -1.896E{-}03, A_{10} = 7.062E{-}03, A_{12} = -2.034E{-}02, A_{14} = -6.137E{-}02, A_{16} = 7.709E{-}02$
Third Surface
$k = 0.000, A_4 = -6.912E{-}03, A_6 = 7.562E{-}02, A_8 = -3.139E{-}01, A_{10} = 4.380E{-}01, A_{12} = -2.477E{-}01, A_{14} = -4.975E{-}02, A_{16} = 5.729E{-}02$
Fourth Surface
$k = 0.000, A_4 = 2.189E{-}02, A_6 = -1.271E{-}01, A_8 = 9.746E{-}02, A_{10} = -7.408E{-}02, A_{12} = 4.872E{-}02, A_{14} = -8.073E{-}04, A_{16} = -2.966E{-}02$
Fifth Surface
$k = 0.000, A_4 = -3.905E{-}02, A_6 = -1.496E{-}01, A_8 = 1.412E{-}01, A_{10} = -8.861E{-}02, A_{12} = -3.623E{-}02, A_{14} = 1.304E{-}01, A_{16} = -8.493E{-}02$
Sixth Surface
$k = 0.000, A_4 = -5.584E{-}02, A_6 = -3.533E{-}03, A_8 = -1.964E{-}02, A_{10} = 1.995E{-}02, A_{12} = -4.134E{-}03, A_{14} = -5.348E{-}03, A_{16} = 2.536E{-}03$
Seventh Surface
$k = 0.000, A_4 = 6.106E{-}02, A_6 = -1.070E{-}02, A_8 = 1.031E{-}02, A_{10} = 9.566E{-}03, A_{12} = -5.906E{-}04, A_{14} = -1.078E{-}04, A_{16} = -3.008E{-}04$
Eighth Surface
$k = 0.000, A_4 = -2.294E{-}02, A_6 = 9.575E{-}03, A_8 = 7.558E{-}03, A_{10} = 4.687E{-}03, A_{12} = 1.223E{-}03, A_{14} = -1.305E{-}04, A_{16} = -3.746E{-}04$
Ninth Surface
$k = 0.000, A_4 = -6.166E{-}02, A_6 = -2.713E{-}02, A_8 = 1.008E{-}02, A_{10} = -2.386E{-}04, A_{12} = -6.953E{-}04, A_{14} = -6.361E{-}05, A_{16} = 4.752E{-}05$ -continued Tenth Surface
k = 0.000, $A_4$ = −8.046E−02, $A_6$ = −8.611E−03, $A_8$ = 4.902E−03, $A_{10}$ = −1.101E−03, $A_{12}$ = −5.329E−05, $A_{14}$ = −3.142E−05, $A_{16}$ = 3.517E−06
Eleventh Surface
k = 0.000, $A_4$ = −1.145E−01, $A_6$ = 3.473E−02, $A_8$ = −4.742E−03, $A_{10}$ = −4.263E−04, $A_{12}$ = −4.328E−05, $A_{14}$ = 4.462E−05, $A_{16}$ = −5.887E−06
Twelfth Surface
k = 0.000, $A_4$ = −6.424E−02, $A_6$ = 9.466E−03, $A_8$ = −1.069E−03, $A_{10}$ = −1.307E−05, $A_{12}$ = 9.654E−06, $A_{14}$ = 2.331E−07, $A_{16}$ = −1.228E−07
f1 = 11.19 mm
f2 = 3.41 mm
f3 = −5.85 mm
f4 = −91.28 mm
f5 = −25.56 mm
f6 = 27.95 mm
f45 = −18.52 mm
F1 = 4.77 mm
The values of the respective conditional expressions are as follows:
F1/f = 1.07
f1/f2 = 3.29
f3/F1 = −1.23
D12/D23 = 5.00
f45/f = −4.16
f6/f = 6.28
f45/f6 = −0.66
R6r/f = 0.62

Accordingly, the imaging lens of Numerical Data Example 2 satisfies the above-described conditional expressions. The distance on the optical axis X from the object-side surface of the first lens L1 to the image plane IM (air conversion length for the filter 10) is 5.94 mm, and downsizing of the imaging lens is attained.

Figure 5:
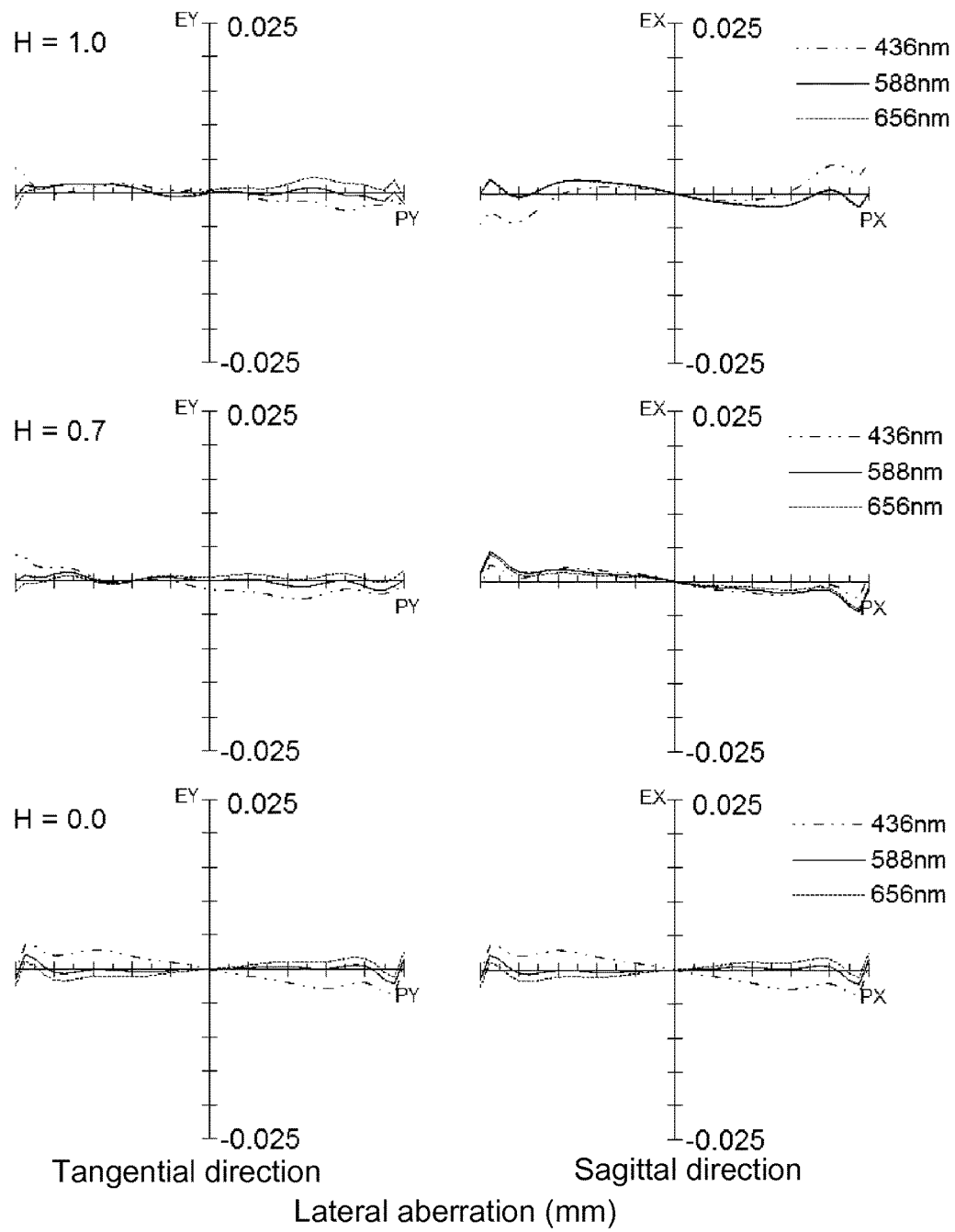
FIG. 5 is an aberration diagram showing a lateral aberration of the imaging lens of FIG. 4.
Figure 6:
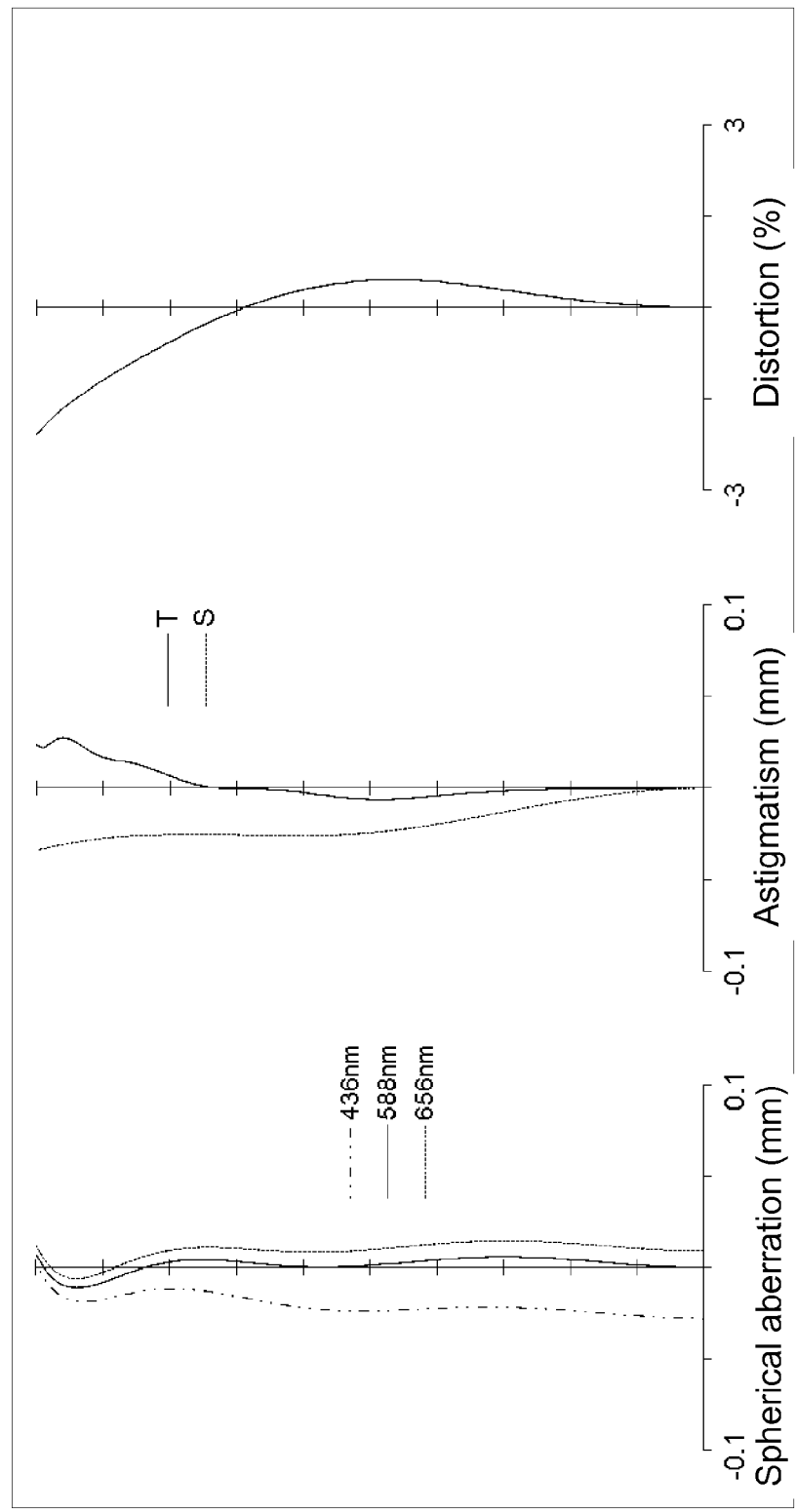
FIG. 6 is an aberration diagram showing a spherical aberration, astigmatism, and a distortion of the imaging lens of FIG. 4.
Figure 7:
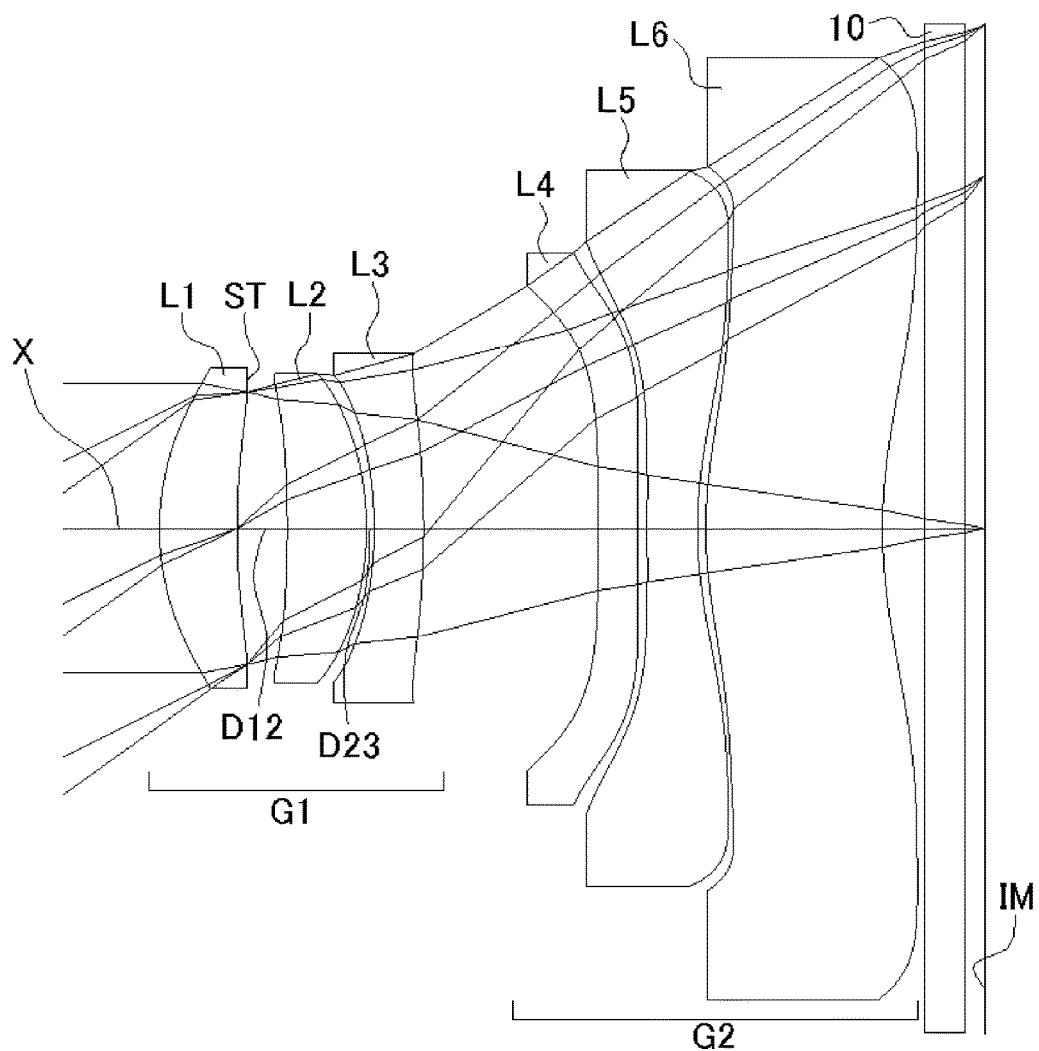
FIG. 7 shows a sectional view of a schematic configuration of an imaging lens in Numerical Data Example 3 according to the embodiment of the present invention.

FIG. 5 shows a lateral aberration that corresponds to the image height ratio H, and FIG. 6 shows a spherical aberration (mm), astigmatism (mm), and a distortion (%), respectively, of the imaging lens of Numerical Data Example 2. As shown in FIGS. 5 and 6, according to the imaging lens of Numerical Data Example 2, the aberrations are also satisfactorily corrected.

NUMERICAL DATA EXAMPLE 3

Basic data are shown below.
f = 4.13 mm, Fno = 2.4, ω = 36.0°
Unit: mm
Surface Data

| Surface Number i | r | d | nd | vd |
|---|---|---|---|---|
| (Object) | ∞ | ∞ | | |
| 1* | 1.540 | 0.464 | 1.5346 | 56.1(=vd1) |
| 2*(Stop) | 4.314 | 0.296(=D12) | | |
| 3* | −8.838 | 0.470 | 1.5346 | 56.1(=vd2) |
| 4* | −1.831 | 0.047(=D23) | | |
| 5* | −2.295 | 0.292 | 1.6355 | 23.9(=vd3) |
| 6* | −5.812 | 1.039 | | |
| 7* | −53.057 | 0.231 | 1.5346 | 56.1(=vd4) |
| 8* | 13.648 | 0.061 | | |
| 9* | 85.665 | 0.296 | 1.5346 | 56.1(=vd5) |
| 10* | 2.489 | 0.050 | | |
| 11* | 2.627 | 1.051 | 1.6142 | 26.0(=vd6) |
| 12* (=R6r) | 2.995 | 0.250 | | |
| 13 | ∞ | 0.238 | 1.5168 | 64.2 |
| 14 | ∞ | 0.119 | | |
| (Image plane) | ∞ | | | |

Aspheric Surface Data

First Surface
k = 0.000, $A_4$ = −5.935E−03, $A_6$ = −9.117E−03, $A_8$ = −1.112E−02, $A_{10}$ = 1.177E−02, $A_{12}$ = −3.881E−02, $A_{14}$ = −3.388E−03, $A_{16}$ = 1.510E−02
Second Surface
k = 0.000, $A_4$ = −1.025E−02, $A_6$ = −3.800E−02, $A_8$ = 8.547E−03, $A_{10}$ = −3.584E−02, $A_{12}$ = 1.252E−02, $A_{14}$ = 1.376E−02, $A_{16}$ = 3.367E−02
Third Surface
k = 0.000, $A_4$ = −8.189E−02, $A_6$ = 1.798E−01, $A_8$ = −5.324E−01, $A_{10}$ = 5.535E−01, $A_{12}$ = −4.665E−02, $A_{14}$ = −8.080E−02, $A_{16}$ = −4.768E−02
Fourth Surface
k = 0.000, $A_4$ = −7.818E−03, $A_6$ = −9.421E−02, $A_8$ = 9.473E−02, $A_{10}$ = −6.182E−02, $A_{12}$ = 5.470E−02, $A_{14}$ = −6.955E−03, $A_{16}$ = −7.586E−02
Fifth Surface
k = 0.000, $A_4$ = −2.114E−02, $A_6$ = −8.287E−02, $A_8$ = 1.220E−01, $A_{10}$ = −1.202E−01, $A_{12}$ = 6.902E−03, $A_{14}$ = 1.668E−01, $A_{16}$ = −2.063E−01
Sixth Surface
k = 0.000, $A_4$ = −1.542E−02, $A_6$ = 2.580E−02, $A_8$ = −8.636E−04, $A_{10}$ = 1.974E−02, $A_{12}$ = −8.650E−03, $A_{14}$ = −5.952E−03, $A_{16}$ = 7.526E−03
Seventh Surface
k = 0.000, $A_4$ = −5.532E−02, $A_6$ = −2.350E−02, $A_8$ = −3.188E−03, $A_{10}$ = 4.416E−03, $A_{12}$ = −1.616E−03, $A_{14}$ = −2.003E−04, $A_{16}$ = 2.989E−04
Eighth Surface
k = 0.000, $A_4$ = −5.211E−02, $A_6$ = −1.916E−02, $A_8$ = −2.473E−03, $A_{10}$ = 1.181E−03, $A_{12}$ = 8.594E−04, $A_{14}$ = 1.698E−04, $A_{16}$ = −9.469E−05
Ninth Surface
k = 0.000, $A_4$ = −4.723E−02, $A_6$ = −1.893E−02, $A_8$ = 1.185E−03, $A_{10}$ = 3.150E−03, $A_{12}$ = 7.818E−05, $A_{14}$ = −2.134E−04, $A_{16}$ = 1.420E−05
Tenth Surface
k = 0.000, $A_4$ = −8.135E−02, $A_6$ = 4.227E−03, $A_8$ = 1.887E−03, $A_{10}$ = −1.201E−05, $A_{12}$ = −2.459E−05, $A_{14}$ = −1.450E−05, $A_{16}$ = 2.312E−07
Eleventh Surface
k = 0.000, $A_4$ = −9.707E−02, $A_6$ = 1.566E−02, $A_8$ = 2.515E−04, $A_{10}$ = −1.913E−04, $A_{12}$ = 4.065E−07, $A_{14}$ = −2.711E−06, $A_{16}$ = −8.073E−07
Twelfth Surface
k = 0.000, $A_4$ = −5.218E−02, $A_6$ = 4.522E−03, $A_8$ = 1.842E−05, $A_{10}$ = −4.945E−06, $A_{12}$ = −2.208E−06, $A_{14}$ = −3.430E−07, $A_{16}$ = 2.047E−08
f1 = 4.23 mm
f2 = 4.22 mm
f3 = −6.17 mm
f4 = −20.28 mm
f5 = −4.80 mm
f6 = 16.68 mm
f45 = −3.84 mm
F1 = 3.56 mm
The values of the respective conditional expressions are as follows:
F1/f = 0.86
f1/f2 = 1.00
f3/F1 = −1.73
D12/D23 = 6.30
f45/f = −0.93
f6/f = 4.04
f45/f6 = −0.23
R6r/f = 0.72

Accordingly, the imaging lens of Numerical Data Example 3 satisfies the above-described conditional expressions. The distance on the optical axis X from the object-side surface of the first lens L1 to the image plane IM (air conversion length for the filter 10) is 4.82 mm, and downsizing of the imaging lens is attained.

Figure 8:
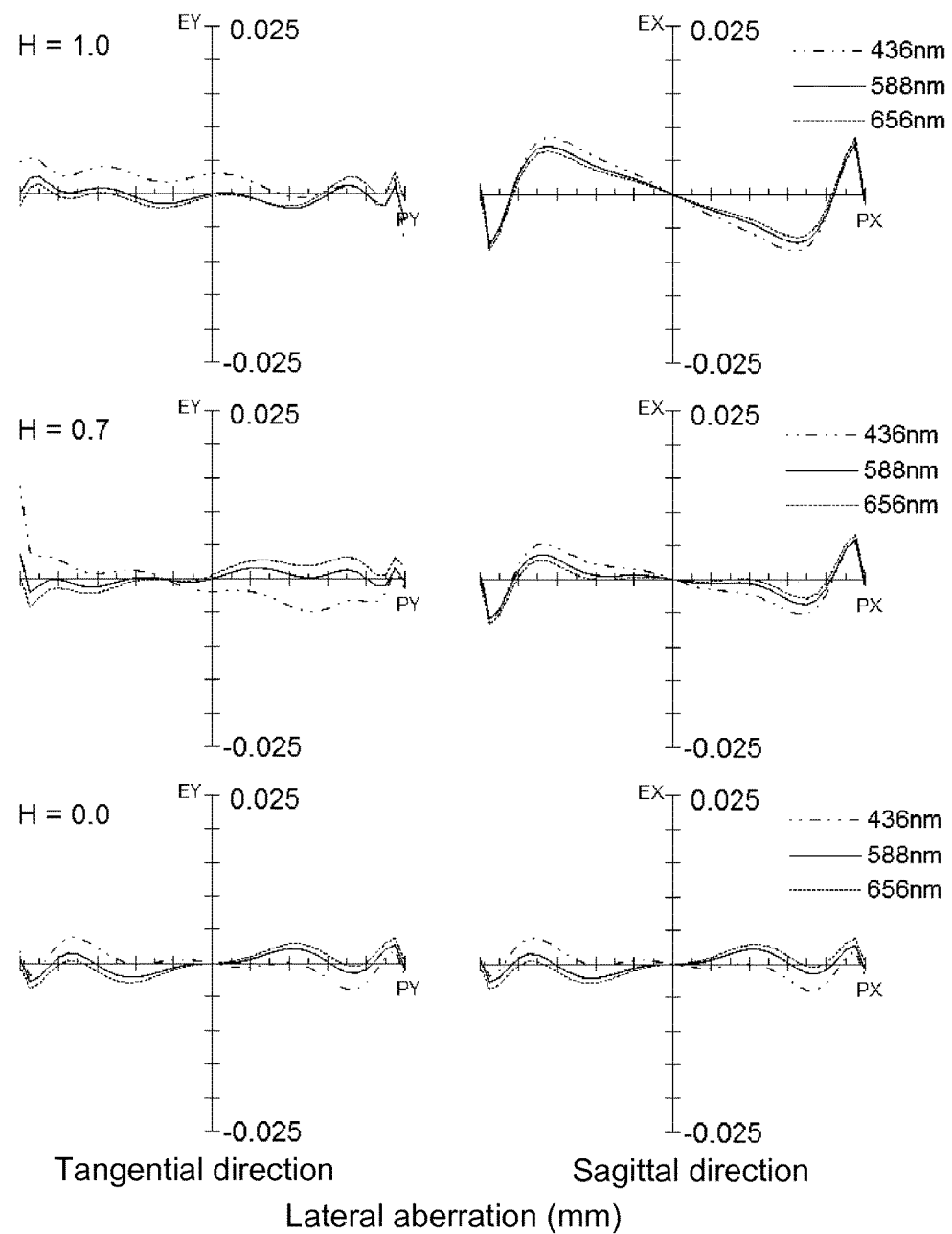
FIG. 8 is an aberration diagram showing a lateral aberration of the imaging lens of FIG. 7.
Figure 9:
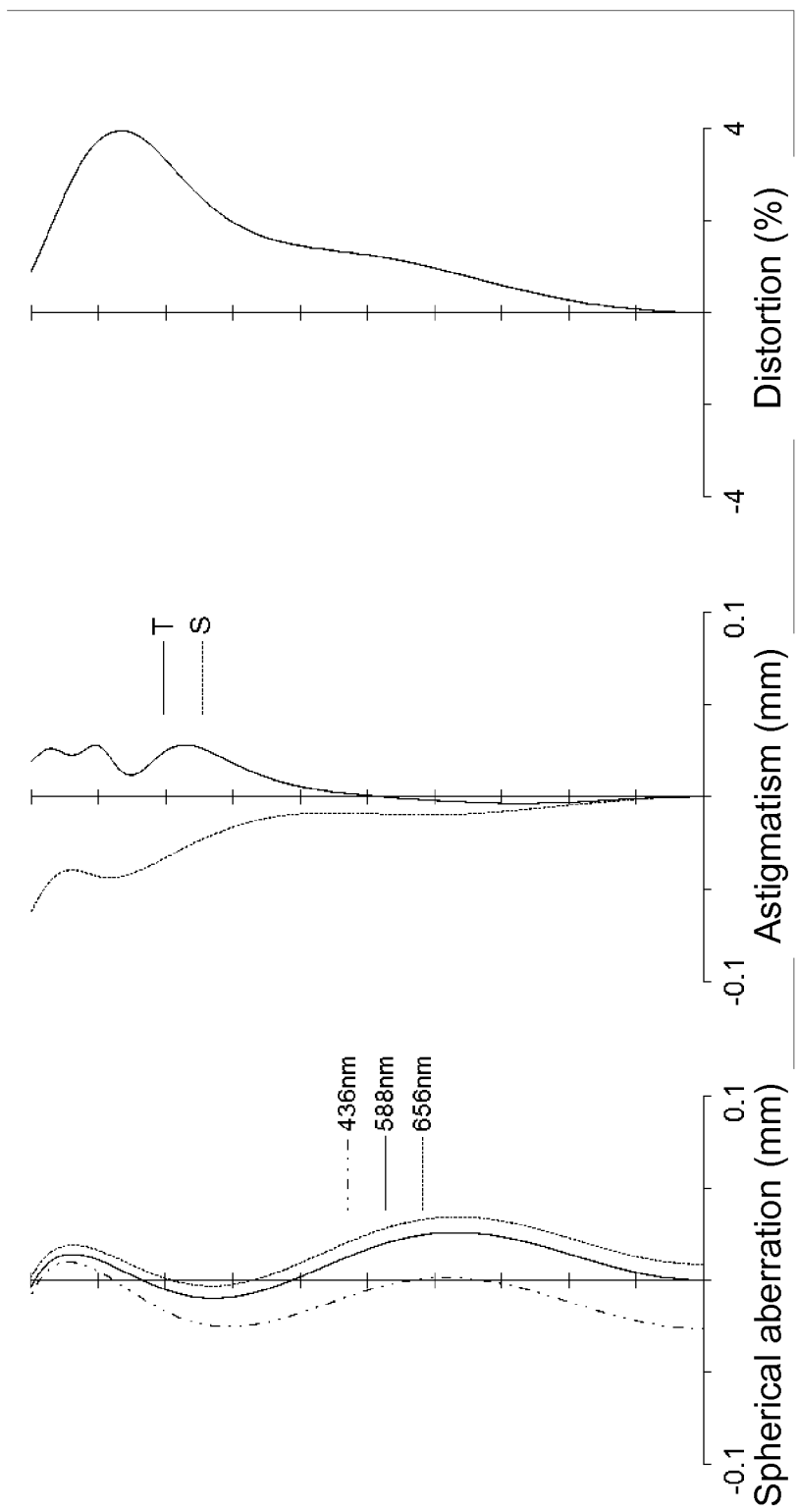
FIG. 9 is an aberration diagram showing a spherical aberration, astigmatism, and a distortion of the imaging lens of FIG. 7.
Figure 10:
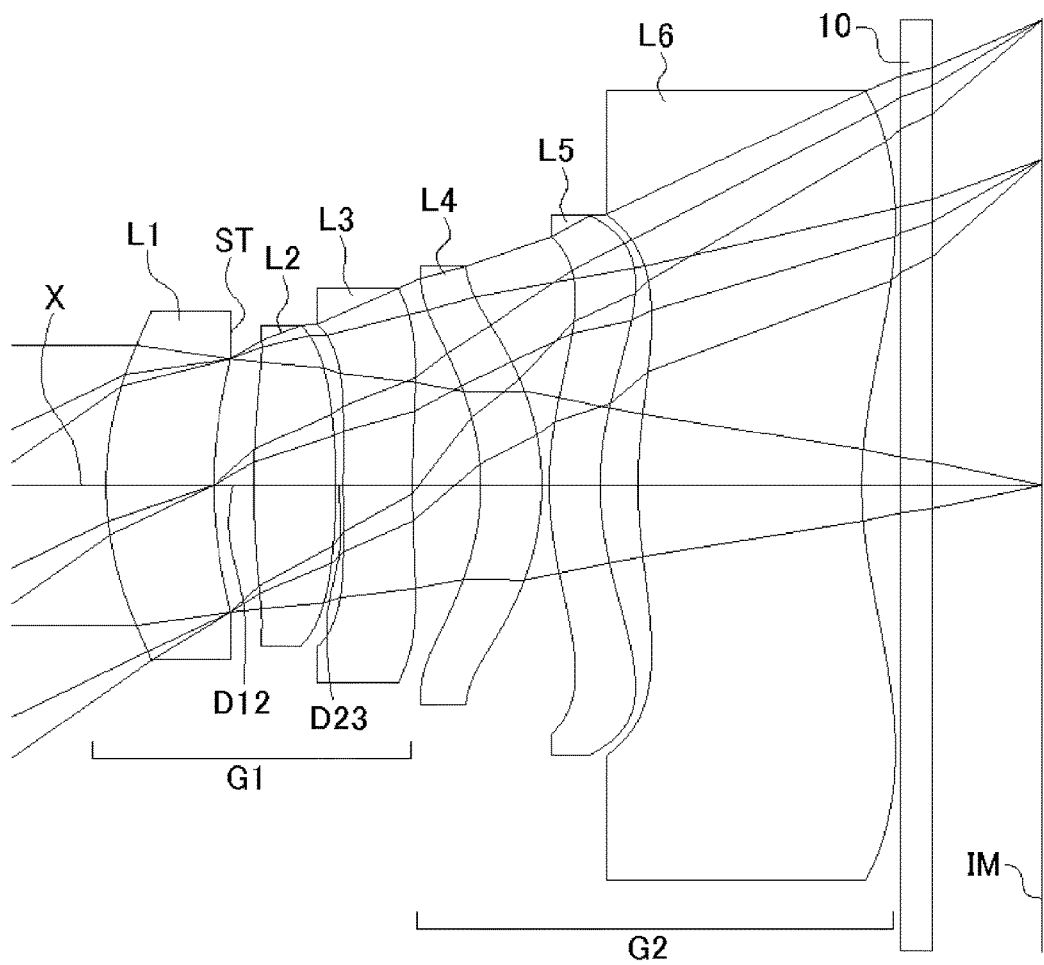
FIG. 10 shows a sectional view of a schematic configuration of an imaging lens in Numerical Data Example 4 according to the embodiment of the present invention.

FIG. 8 shows a lateral aberration that corresponds to the image height ratio H, and FIG. 9 shows a spherical aberration (mm), astigmatism (mm), and a distortion (%), respectively, of the imaging lens of Numerical Data Example 3. As shown in FIGS. 8 and 9, according to the imaging lens of Numerical Data Example 3, the aberrations are also satisfactorily corrected.

NUMERICAL DATA EXAMPLE 4

Basic data are shown below.
f = 4.34 mm, Fno = 2.4, ω = 34.7°
Unit: mm
Surface Data

| Surface Number i | r | d | nd | vd |
|---|---|---|---|---|
| (Object) | ∞ | ∞ | | |
| 1* | 2.119 | 0.693 | 1.5346 | 56.1(=vd1) |
| 2*(Stop) | 2.922 | 0.259(=D12) | | |
| 3* | 6.115 | 0.526 | 1.5346 | 56.1(=vd2) |
| 4* | −4.838 | 0.049(=D23) | | |
| 5* | 29.808 | 0.444 | 1.6355 | 23.9(=vd3) |
| 6* | 7.157 | 0.439 | | |
| 7* | −1.586 | 0.394 | 1.5346 | 56.1(=vd4) |
| 8* | −1.776 | 0.049 | | |
| 9* | 2.273 | 0.326 | 1.5346 | 56.1(=vd5) |
| 10* | 1.945 | 0.243 | | |
| 11* | 2.919 | 1.442 | 1.6142 | 26.0(=vd6) |
| 12* | 2.744 (=R6r) | 0.250 | | |
| 13 | ∞ | 0.200 | 1.5168 | 64.2 |
| 14 | ∞ | 0.704 | | |
| (Image plane) | ∞ | | | |

Aspheric Surface Data

First Surface
k = 0.000, $A_4$ = −4.403E−03, $A_6$ = −7.214E−03, $A_8$ = −6.015E−03, $A_{10}$ = 1.512E−02, $A_{12}$ = −2.152E−02, $A_{14}$ = 1.164E−02, $A_{16}$ = −2.353E−03
Second Surface
k = 0.000, $A_4$ = 6.162E−03, $A_6$ = −3.128E−02, $A_8$ = −4.670E−03, $A_{10}$ = 7.362E−03, $A_{12}$ = −1.750E−02, $A_{14}$ = −5.933E−02, $A_{16}$ = 7.387E−02
Third Surface
k = 0.000, $A_4$ = 3.074E−03, $A_6$ = 6.740E−02, $A_8$ = −3.162E−01, $A_{10}$ = 4.399E−01, $A_{12}$ = −2.449E−01, $A_{14}$ = −4.798E−02, $A_{16}$ = 5.457E−02
Fourth Surface
k = 0.000, $A_4$ = −1.200E−03, $A_6$ = −1.288E−01, $A_8$ = 9.907E−02, $A_{10}$ = −7.458E−02, $A_{12}$ = 4.808E−02, $A_{14}$ = −1.676E−03, $A_{16}$ = −2.982E−02
Fifth Surface
k = 0.000, $A_4$ = −5.300E−02, $A_6$ = −1.495E−01, $A_8$ = 1.371E−01, $A_{10}$ = −9.159E−02, $A_{12}$ = −3.756E−02, $A_{14}$ = 1.309E−01, $A_{16}$ = −8.324E−02
Sixth Surface
k = 0.000, $A_4$ = −5.271E−02, $A_6$ = −1.060E−02, $A_8$ = −2.073E−02, $A_{10}$ = 2.016E−02, $A_{12}$ = −3.924E−03, $A_{14}$ = −5.276E−03, $A_{16}$ = 2.558E−03
Seventh Surface
k = 0.000, $A_4$ = 5.926E−02, $A_6$ = −1.017E−02, $A_8$ = 1.028E−02, $A_{10}$ = 9.421E−03, $A_{12}$ = −6.570E−04, $A_{14}$ = −1.214E−04, $A_{16}$ = −2.892E−04
Eighth Surface
k = 0.000, $A_4$ = −2.381E−02, $A_6$ = 8.250E−03, $A_8$ = 7.470E−03, $A_{10}$ = 4.799E−03, $A_{12}$ = 1.267E−03, $A_{14}$ = −1.239E−04, $A_{16}$ = −3.841E−04
Ninth Surface
k = 0.000, $A_4$ = −6.579E−02, $A_6$ = −2.423E−02, $A_8$ = 9.859E−03, $A_{10}$ = −3.297E−04, $A_{12}$ = −7.230E−04, $A_{14}$ = −7.839E−05, $A_{16}$ = 3.833E−05
Tenth Surface
k = 0.000, $A_4$ = −8.158E−02, $A_6$ = −1.080E−02, $A_8$ = 4.351E−03, $A_{10}$ = −1.257E−03, $A_{12}$ = −8.723E−05, $A_{14}$ = −3.896E−05, $A_{16}$ = 2.306E−06
Eleventh Surface
k = 0.000, $A_4$ = −1.138E−01, $A_6$ = 2.896E−02, $A_8$ = −5.443E−03, $A_{10}$ = −4.608E−04, $A_{12}$ = −3.871E−05, $A_{14}$ = 4.778E−05, $A_{16}$ = −5.522E−06
Twelfth Surface
k = 0.000, $A_4$ = −6.184E−02, $A_6$ = 8.621E−03, $A_8$ = −1.011E−03, $A_{10}$ = −7.968E−06, $A_{12}$ = 9.849E−06, $A_{14}$ = 1.871E−07, $A_{16}$ = −1.260E−07
f1 = 11.09 mm
f2 = 5.14 mm
f3 = −14.93 mm
f4 = −99.99 mm
f5 = −38.67 mm
f6 = 34.86 mm
f45 = −25.84 mm
F1 = 4.82 mm
The values of the respective conditional expressions are as follows:
F1/f = 1.11
f1/f2 = 2.16
f3/F1 = −3.10
D12/D23 = 5.29
f45/f = −5.96
f6/f = 8.04
f45/f6 = −0.74
R6r/f = 0.63

Accordingly, the imaging lens of Numerical Data Example 4 satisfies the above-described conditional expressions. The distance on the optical axis X from the object-side surface of the first lens L1 to the image plane IM (air conversion length for the filter 10) is 5.95 mm, and downsizing of the imaging lens is attained.

Figure 11:
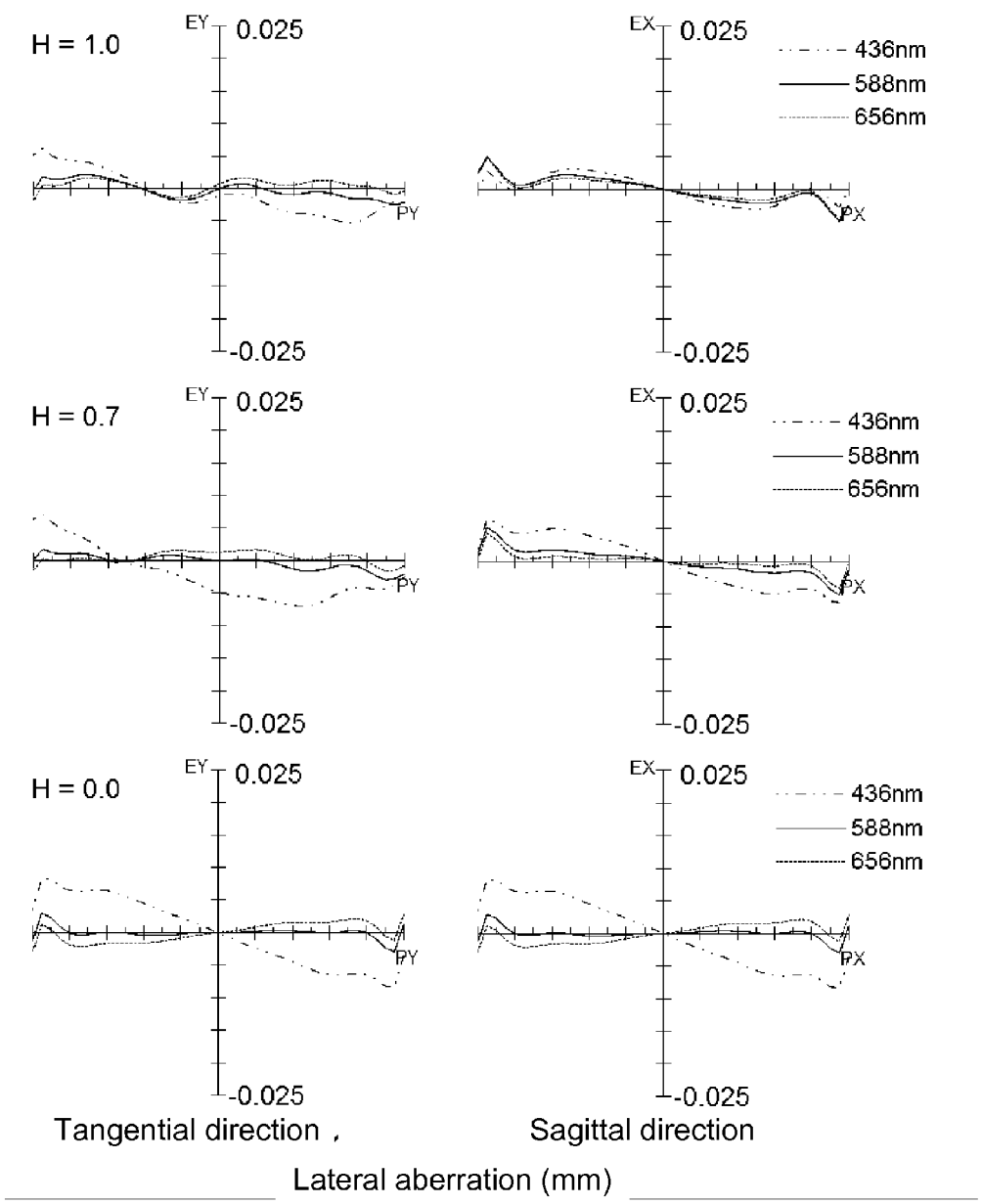
FIG. 11 is an aberration diagram showing a lateral aberration of the imaging lens of FIG. 10.
Figure 12:
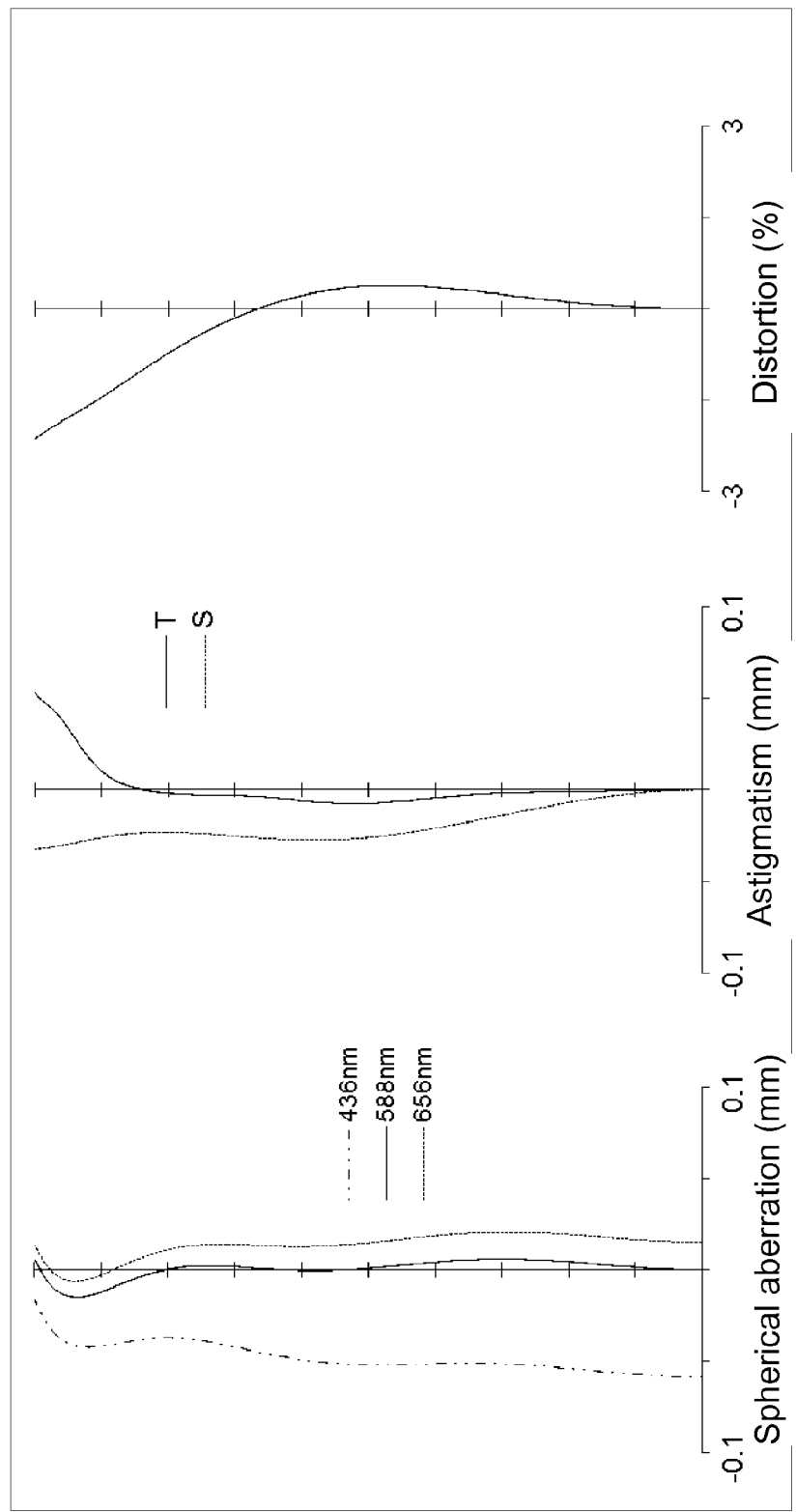
FIG. 12 is an aberration diagram showing a spherical aberration, astigmatism, and a distortion of the imaging lens of FIG. 10.
Figure 13:
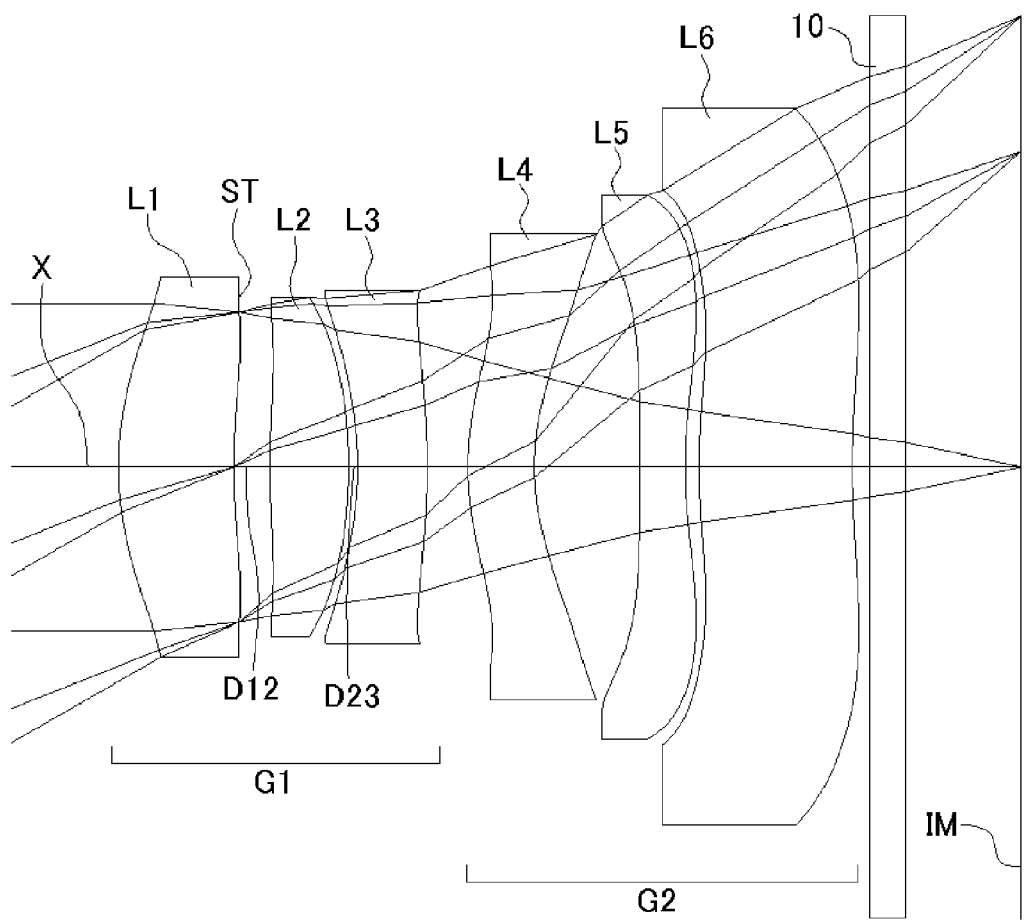
FIG. 13 shows a sectional view of a schematic configuration of an imaging lens in Numerical Data Example 5 according to the embodiment of the present invention.

FIG. 11 shows a lateral aberration that corresponds to the image height ratio H, and FIG. 12 shows a spherical aberration (mm), astigmatism (mm), and a distortion (%), respectively, of the imaging lens of Numerical Data Example 4. As shown in FIGS. 11 and 12, according to the imaging lens of Numerical Data Example 4, the aberrations are also satisfactorily corrected.

NUMERICAL DATA EXAMPLE 5

Basic data are shown below.
f = 5.24 mm, Fno = 2.4, ω = 29.8°
Unit: mm
Surface Data

| Surface Number i | r | d | nd | vd |
|---|---|---|---|---|
| (Object) | ∞ | ∞ | | |
| 1* | 2.172 | 0.769 | 1.5346 | 56.1(=vd1) |
| 2*(Stop) | 4.250 | 0.239(=D12) | | |
| 3* | 5.836 | 0.522 | 1.5346 | 56.1(=vd2) |
| 4* | −3.421 | 0.064(=D23) | | |
| 5* | −2.186 | 0.459 | 1.6355 | 23.9(=vd3) |
| 6* | −4.857 | 0.272 | | |
| 7* | 1.936 | 0.443 | 1.5346 | 56.1(=vd4) |
| 8* | 1.719 | 0.701 | | |
| 9* | 100.000 | 0.300 | 1.5346 | 56.1(=vd5) |
| 10* | 3.123 | 0.097 | | |
| 11* | 4.309 | 1.017 | 1.6142 | 26.0(=vd6) |
| 12* | 5.968 (=R6r) | 0.119 | | |
| 13 | ∞ | 0.238 | 1.5168 | 64.2 |
| 14 | ∞ | 0.768 | | |
| (Image plane) | ∞ | | | |

-continued

Aspheric Surface Data

First Surface
k = 0.000, $A_4$ = −2.088E−02, $A_6$ = −1.023E−02, $A_8$ = −8.691E−03, $A_{10}$ = 9.684E−03, $A_{12}$ = −1.055E−02, $A_{14}$ = 5.032E−03, $A_{16}$ = −6.710E−04
Second Surface
k = 0.000, $A_4$ = −6.691E−02, $A_6$ = −2.916E−02, $A_8$ = −8.868E−03, $A_{10}$ = 1.548E−02, $A_{12}$ = 3.994E−02, $A_{14}$ = −4.925E−02, $A_{16}$ = 1.734E−02
Third Surface
k = 0.000, $A_4$ = −7.488E−02, $A_6$ = −1.912E−02, $A_8$ = −6.041E−02, $A_{10}$ = 1.502E−01, $A_{12}$ = −7.925E−02, $A_{14}$ = 1.589E−03, $A_{16}$ = 7.000E−03
Fourth Surface
k = 0.000, $A_4$ = −1.569E−02, $A_6$ = −7.574E−02, $A_8$ = 1.218E−01, $A_{10}$ = −9.810E−02, $A_{12}$ = 9.445E−03, $A_{14}$ = 2.847E−02, $A_{16}$ = −1.049E−02
Fifth Surface
k = 0.000, $A_4$ = 1.285E−01, $A_6$ = −1.224E−01, $A_8$ = 1.366E−01, $A_{10}$ = −1.031E−01, $A_{12}$ = −2.725E−02, $A_{14}$ = 8.106E−02, $A_{16}$ = −2.887E−02
Sixth Surface
k = 0.000, $A_4$ = 5.791E−02, $A_6$ = −2.348E−02, $A_8$ = 2.772E−03, $A_{10}$ = 4.828E−03, $A_{12}$ = −9.735E−03, $A_{14}$ = 1.406E−02, $A_{16}$ = −3.998E−03
Seventh Surface
k = 0.000, $A_4$ = −1.189E−01, $A_6$ = 5.063E−03, $A_8$ = −1.046E−02, $A_{10}$ = 1.359E−03, $A_{12}$ = −9.423E−04, $A_{14}$ = 3.641E−03, $A_{16}$ = −1.316E−03
Eighth Surface
k = 0.000, $A_4$ = −8.514E−02, $A_6$ = −9.069E−03, $A_8$ = 5.478E−04, $A_{10}$ = 1.167E−03, $A_{12}$ = 8.254E−05, $A_{14}$ = −5.007E−05, $A_{16}$ = −4.482E−05
Ninth Surface
k = 0.000, $A_4$ = −5.123E−02, $A_6$ = 3.968E−03, $A_8$ = −1.517E−03, $A_{10}$ = −3.192E−04, $A_{12}$ = 9.384E−05, $A_{14}$ = 3.503E−06, $A_{16}$ = 4.323E−05
Tenth Surface
k = 0.000, $A_4$ = −1.110E−01, $A_6$ = 2.878E−02, $A_8$ = −8.182E−03, $A_{10}$ = 1.074E−03, $A_{12}$ = 5.791E−05, $A_{14}$ = 3.028E−05, $A_{16}$ = −2.305E−05
Eleventh Surface
k = 0.000, $A_4$ = −9.515E−02, $A_6$ = 1.817E−02, $A_8$ = −1.045E−03, $A_{10}$ = 1.014E−04, $A_{12}$ = −1.021E−04, $A_{14}$ = 2.363E−05, $A_{16}$ = −8.053E−06
Twelfth Surface
k = 0.000, $A_4$ = −4.547E−02, $A_6$ = 5.453E−03, $A_8$ = −2.136E−04, $A_{10}$ = −5.780E−05, $A_{12}$ = 7.868E−06, $A_{14}$ = −6.854E−07, $A_{16}$ = 2.237E−08
f1 = 7.36 mm
f2 = 4.12 mm
f3 = −6.70 mm
f4 = −99.75 mm
f5 = −6.04 mm
f6 = 20.47 mm
f45 = −6.10 mm
F1 = 4.77 mm
The values of the respective conditional expressions are as follows:
F1/f = 0.91
f1/f2 = 1.79
f3/F1 = −1.40
D12/D23 = 3.73
f45/f = −1.16
f6/f = 3.91
f45/f6 = −0.30
R6r/f = 1.14

Accordingly, the imaging lens of Numerical Data Example 5 satisfies the above-described conditional expressions. The distance on the optical axis X from the object-side surface of the first lens L1 to the image plane IM (air conversion length for the filter 10) is 5.93 mm, and downsizing of the imaging lens is attained.

Figure 14:
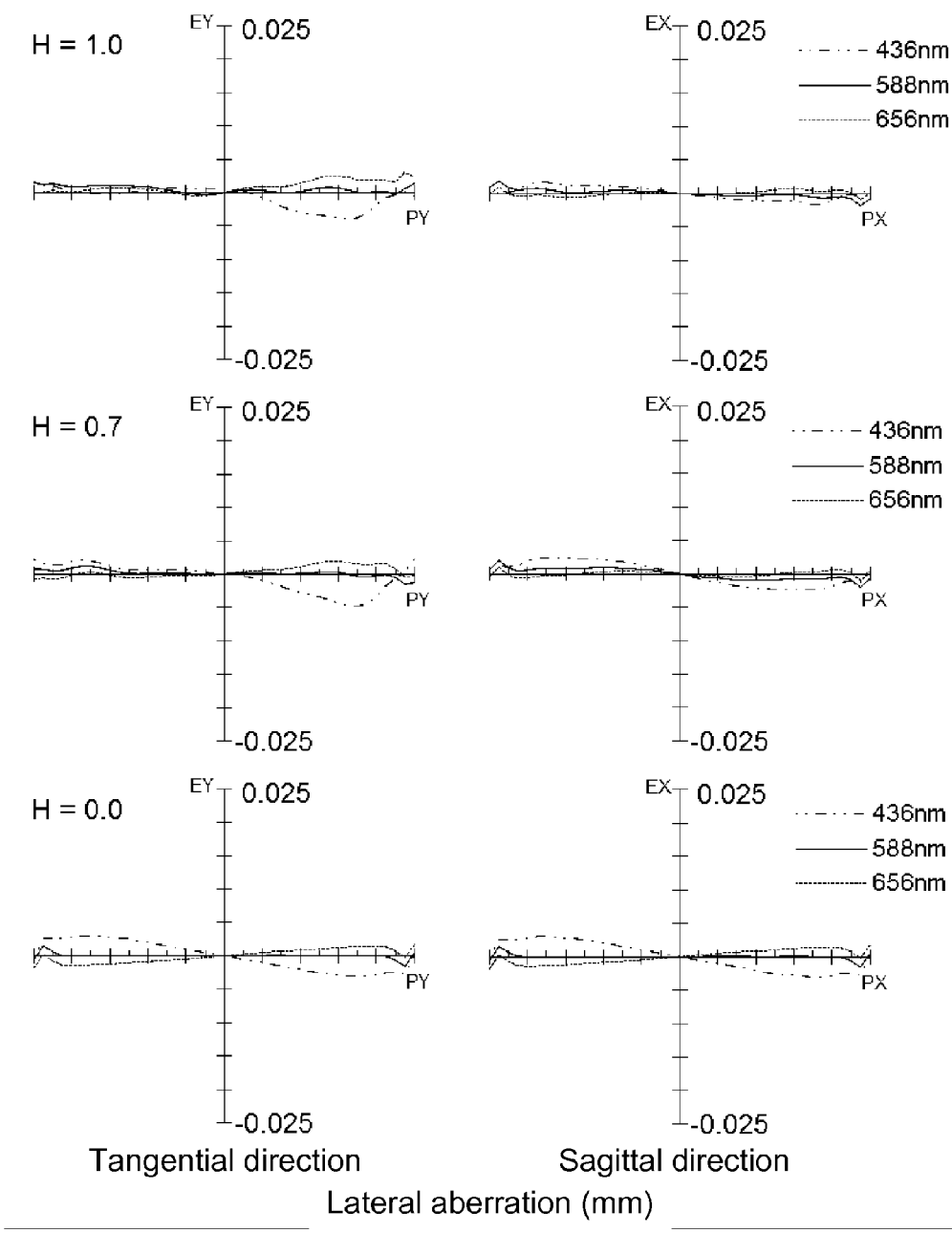
FIG. 14 is an aberration diagram showing a lateral aberration of the imaging lens of FIG. 13.
Figure 15:
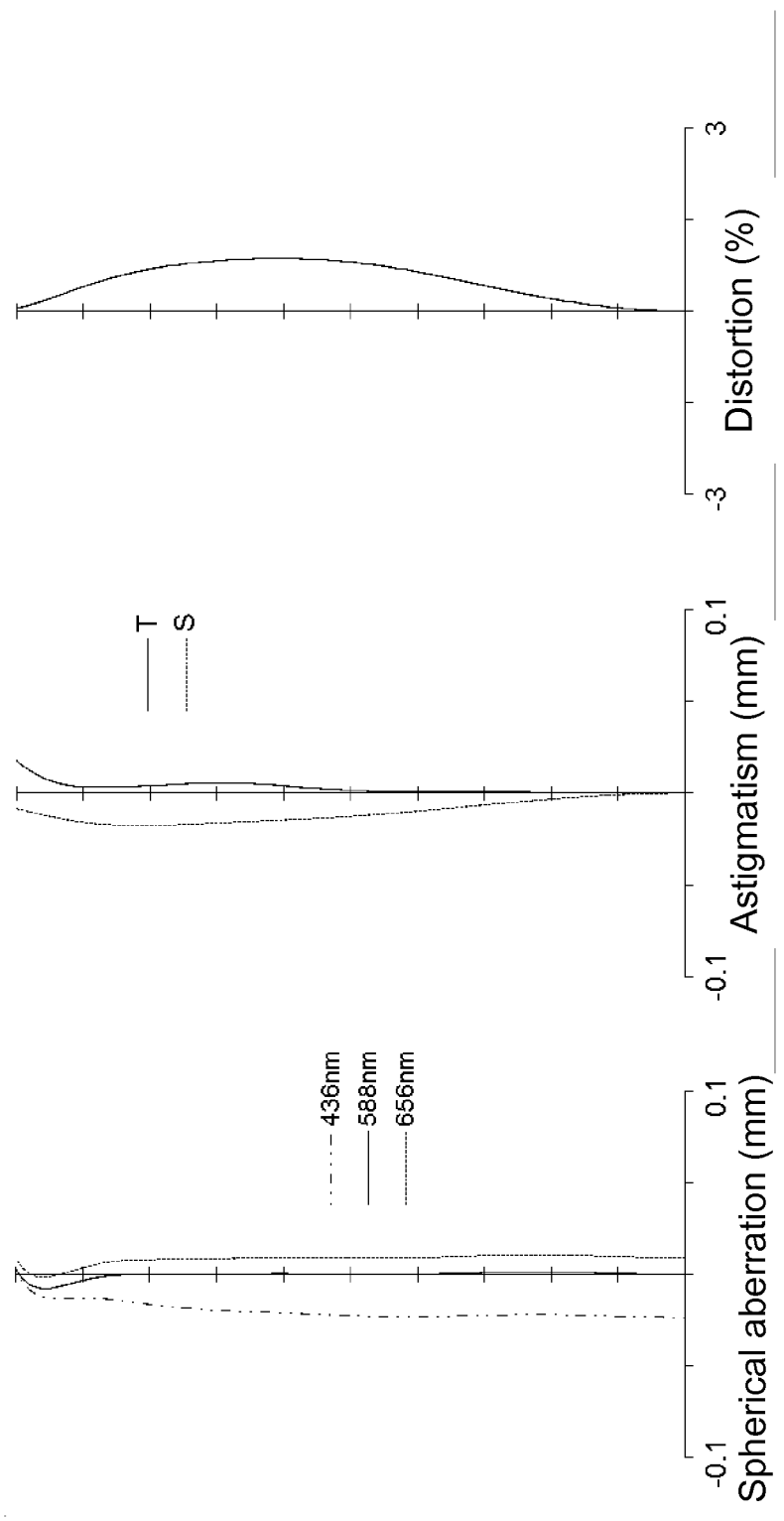
FIG. 15 is an aberration diagram showing a spherical aberration, astigmatism, and a distortion of the imaging lens of FIG. 13.
Figure 16:
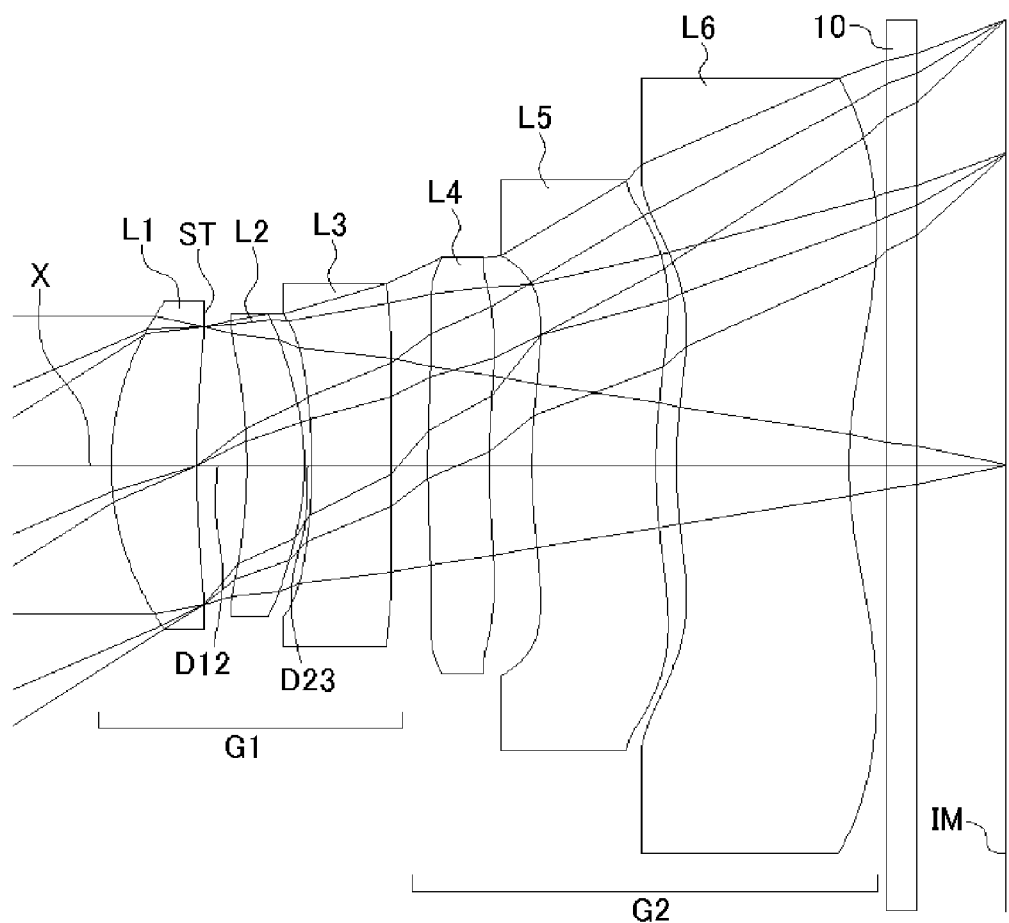
FIG. 16 shows a sectional view of a schematic configuration of an imaging lens in Numerical Data Example 6 according to the embodiment of the present invention.

FIG. 14 shows a lateral aberration that corresponds to the image height ratio H, and FIG. 15 shows a spherical aberration (mm), astigmatism (mm), and a distortion (%), respectively, of the imaging lens of Numerical Data Example 5. As shown in FIGS. 14 and 15, according to the imaging lens of Numerical Data Example 5, the aberrations are also satisfactorily corrected.

NUMERICAL DATA EXAMPLE 6

Basic data are shown below.
f = 4.81 mm, Fno = 2.4, ω = 32.0°
Unit: mm
Surface Data

| Surface Number i | r | d | nd | vd |
|---|---|---|---|---|
| (Object) | ∞ | ∞ | | |
| 1* | 1.842 | 0.575 | 1.5346 | 56.1(=vd1) |
| 2*(Stop) | 7.266 | 0.335(=D12) | | |
| 3* | −4.093 | 0.388 | 1.5346 | 56.1(=vd2) |
| 4* | −1.804 | 0.050(=D23) | | |
| 5* | −3.756 | 0.529 | 1.6355 | 23.9(=vd3) |
| 6* | 14.204 | 0.250 | | |
| 7* | 8.100 | 0.412 | 1.5346 | 56.1(=vd4) |
| 8* | 4.557 | 0.287 | | |
| 9* | 4.075 | 0.832 | 1.6142 | 26.0(=vd5) |
| 10* | 3.525 | 0.137 | | |
| 11* | 2.845 | 1.160 | 1.5346 | 56.1(=vd6) |
| 12* | 2.837 (=R6r) | 0.250 | | |
| 13 | ∞ | 0.200 | 1.5168 | 64.2 |
| 14 | ∞ | 0.598 | | |
| (Image plane) | ∞ | | | |

Aspheric Surface Data

First Surface
k = 0.000, $A_4$ = 2.565E−03, $A_6$ = −7.583E−03, $A_8$ = 5.292E−03, $A_{10}$ = 7.267E−03, $A_{12}$ = −1.791E−02, $A_{14}$ = 8.414E−03, $A_{16}$ = −1.337E−03
Second Surface
k = 0.000, $A_4$ = −8.223E−03, $A_6$ = −1.262E−02, $A_8$ = 7.831E−03, $A_{10}$ = 6.333E−03, $A_{12}$ = −9.244E−04, $A_{14}$ = −2.581E−02, $A_{16}$ = 2.177E−02
Third Surface
k = 0.000, $A_4$ = −5.651E−02, $A_6$ = 1.536E−01, $A_8$ = −3.153E−01, $A_{10}$ = 4.294E−01, $A_{12}$ = −2.195E−01, $A_{14}$ = −2.262E−02, $A_{16}$ = 4.223E−02
Fourth Surface
k = 0.000, $A_4$ = 1.180E−01, $A_6$ = −1.005E−01, $A_8$ = 1.029E−01, $A_{10}$ = −6.200E−02, $A_{12}$ = 4.647E−02, $A_{14}$ = −3.884E−02, $A_{16}$ = 3.229E−03
Fifth Surface
k = 0.000, $A_4$ = 6.450E−02, $A_6$ = −1.594E−01, $A_8$ = 1.428E−01, $A_{10}$ = −6.683E−02, $A_{12}$ = −7.350E−02, $A_{14}$ = 1.102E−01, $A_{16}$ = −5.785E−02
Sixth Surface
k = 0.000, $A_4$ = −4.423E−02, $A_6$ = −2.042E−03, $A_8$ = −8.354E−03, $A_{10}$ = 1.835E−02, $A_{12}$ = −3.205E−03, $A_{14}$ = −6.587E−03, $A_{16}$ = 2.947E−03
Seventh Surface
k = 0.000, $A_4$ = −5.452E−02, $A_6$ = −1.950E−04, $A_8$ = 6.967E−03, $A_{10}$ = 5.352E−03, $A_{12}$ = −1.721E−03, $A_{14}$ = 3.532E−04, $A_{16}$ = −7.046E−05
Eighth Surface
k = 0.000, $A_4$ = −9.743E−02, $A_6$ = 7.161E−03, $A_8$ = 2.532E−05, $A_{10}$ = 3.199E−04, $A_{12}$ = 4.700E−06, $A_{14}$ = −3.275E−05, $A_{16}$ = 2.530E−04
Ninth Surface
k = 0.000, $A_4$ = −4.425E−02, $A_6$ = −2.570E−02, $A_8$ = 4.511E−03, $A_{10}$ = −3.120E−04, $A_{12}$ = −3.774E−03, $A_{14}$ = 1.613E−03, $A_{16}$ = −4.085E−04
Tenth Surface
k = 0.000, $A_4$ = −6.716E−02, $A_6$ = 4.534E−03, $A_8$ = −2.137E−03, $A_{10}$ = −5.641E−06, $A_{12}$ = 1.019E−04, $A_{14}$ = 2.893E−06, $A_{16}$ = 9.273E−07
Eleventh Surface
k = 0.000, $A_4$ = −1.273E−01, $A_6$ = 6.786E−03, $A_8$ = 2.283E−03, $A_{10}$ = 1.014E−04, $A_{12}$ = −7.450E−06, $A_{14}$ = −5.377E−06, $A_{16}$ = −3.593E−07
Twelfth Surface
k = 0.000, $A_4$ = −5.471E−02, $A_6$ = 1.899E−03, $A_8$ = 6.800E−04, $A_{10}$ = −1.062E−04, $A_{12}$ = 2.142E−06, $A_{14}$ = 1.033E−07, $A_{16}$ = −9.696E−09
f1 = 4.45 mm
f2 = 5.70 mm -continued f3 = −4.62 mm
f4 = −20.32 mm
f5 = −100.17 mm
f6 = 38.10 mm
f45 = −15.73 mm
F1 = 5.27 mm
The values of the respective conditional expressions are as follows:
F1/f = 1.10
f1/f2 = 0.78
f3/F1 = −0.88
D12/D23 = 6.70
f45/f = −3.27
f6/f = 7.93
f45/f6 = −0.41
R6r/f = 0.59

Accordingly, the imaging lens of Numerical Data Example 6 satisfies the above-described conditional expressions. The distance on the optical axis X from the object-side surface of the first lens L1 to the image plane IM (air conversion length for the filter 10) is 5.93 mm, and downsizing of the imaging lens is attained.

Figure 17:
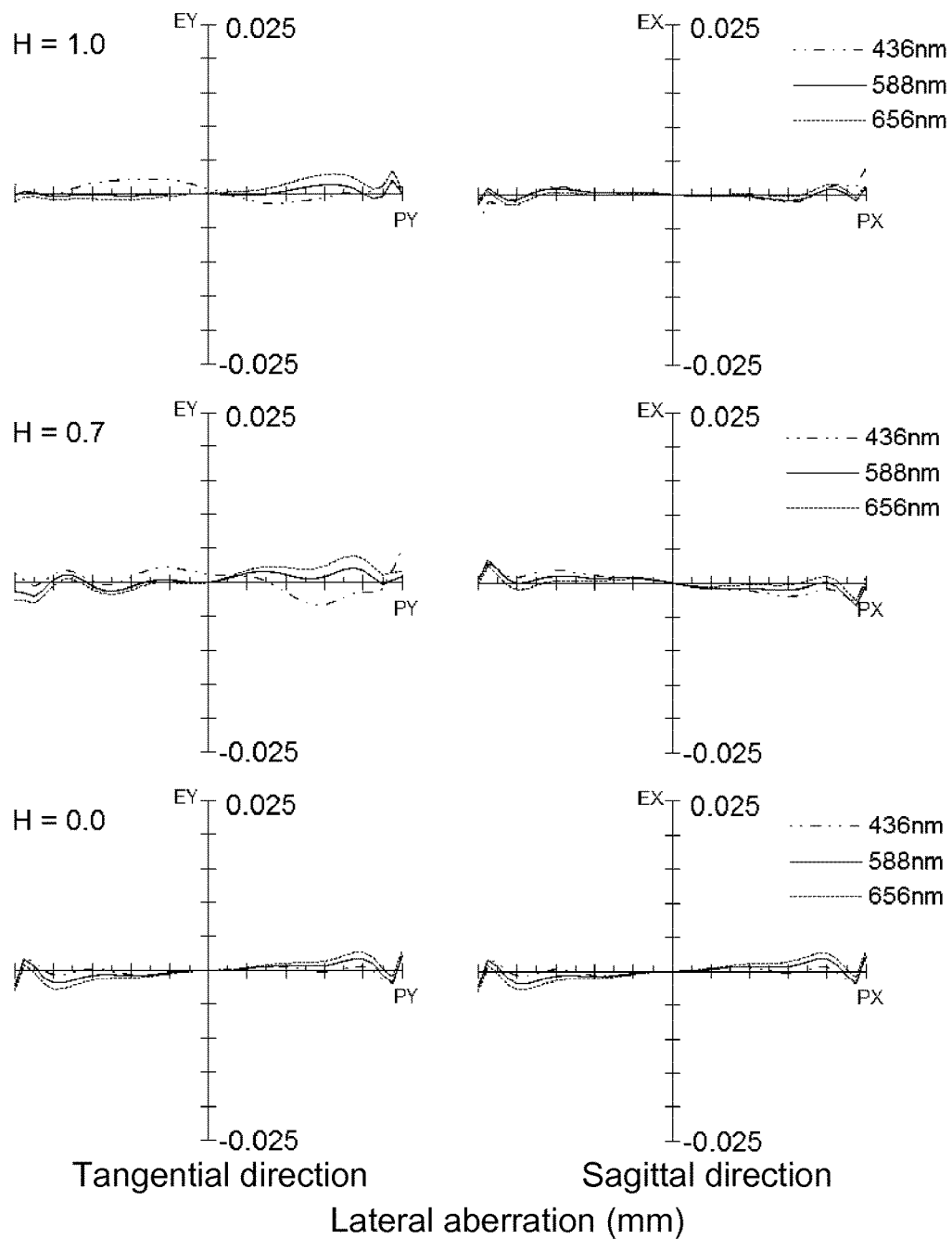
FIG. 17 is an aberration diagram showing a lateral aberration of the imaging lens of FIG. 16.
Figure 18:
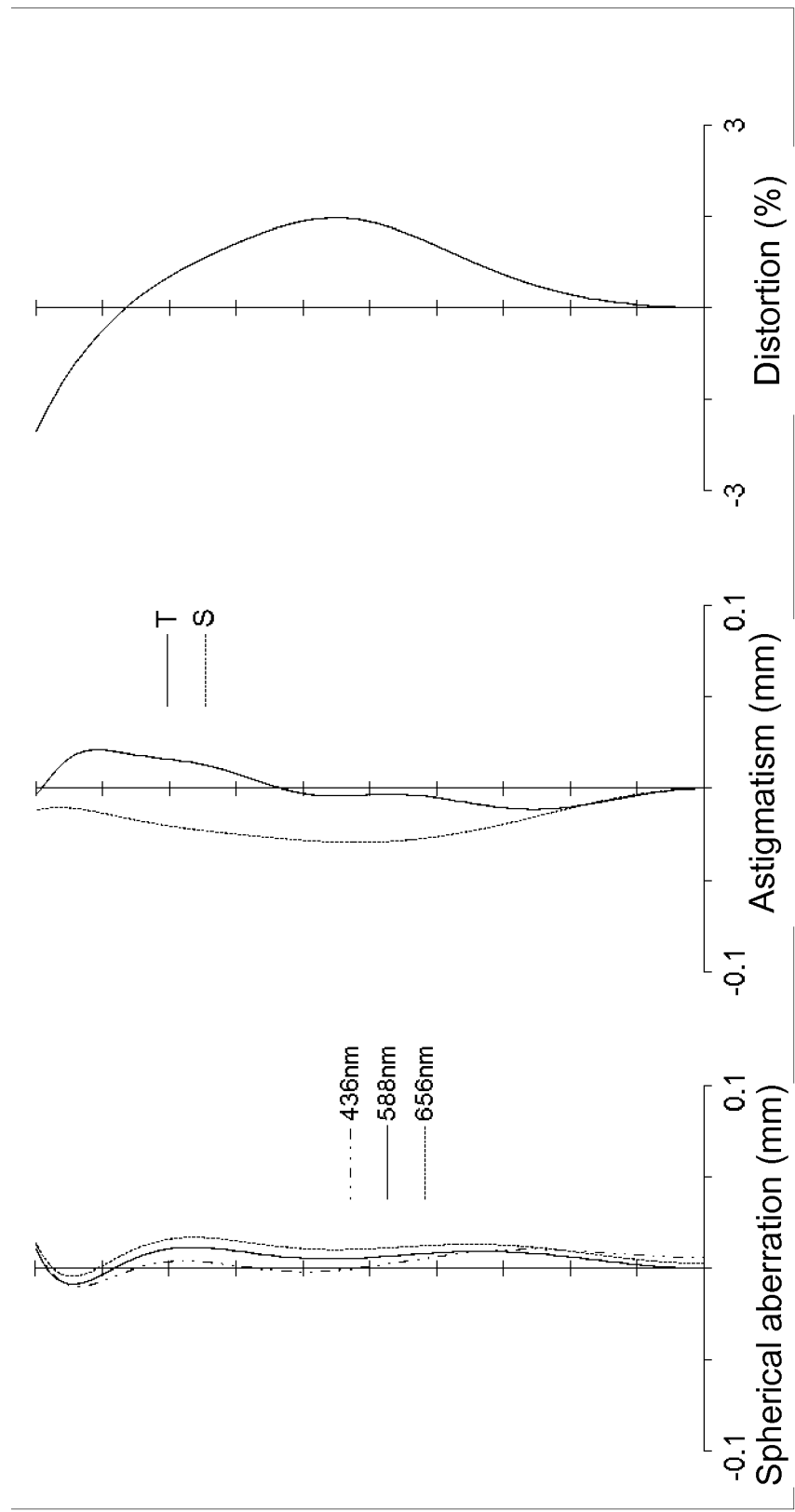
FIG. 18 is an aberration diagram showing a spherical aberration, astigmatism, and a distortion of the imaging lens of FIG. 16.

FIG. 17 shows a lateral aberration that corresponds to the image height ratio H, and FIG. 18 shows a spherical aberration (mm), astigmatism (mm), and a distortion (%), respectively, of the imaging lens of Numerical Data Example 6. As shown in FIGS. 17 and 18, according to the imaging lens of Numerical Data Example 6, the aberrations are also satisfactorily corrected.

According to the imaging lens of the embodiment described above, it is achievable to have a wide angle of view (2ω) of 70° or greater. According to Numerical Data Examples 1 to 6, the imaging lenses have wide angles of view of 59.6° to 72.0°. According to the imaging lens of the embodiment, it is possible to take an image over a wider range than that taken by a conventional imaging lens.

Moreover, in these years, with advancement in digital zoom technology, which enables to enlarge any area of an image obtained through an imaging lens by image processing, an imaging element having a high pixel count is often used in combination with a high-resolution imaging lens. In case of such an imaging element with a high pixel count, a light-receiving area of each pixel decreases, so that an image tends to be dark. As a method for correcting this problem, there is a method of enhancing light-receiving sensitivity of the imaging element using an electrical circuit. However, when the light-receiving sensitivity increases, a noise component that does not directly contribute to image formation is also amplified, so that it is necessary to use another circuit for reducing the noise. According to the imaging lenses of Numerical Data Examples 1 to 6, the Fnos are as small as 2.4. According to the imaging lens of the embodiment, it is possible to obtain a sufficiently bright image without the above-described electrical circuit.

Accordingly, when the imaging lens of the embodiment is mounted in an imaging optical system, such as cameras built in portable devices including cellular phones, portable information terminals, and smartphones, digital still cameras, security cameras, onboard cameras, and network cameras, it is possible to attain both high performance and downsizing of the cameras.

The present invention is applicable to an imaging lens to be mounted in relatively small cameras, such as cameras to be built in portable devices including cellular phones, smartphones, and portable information terminals, digital still cameras, security cameras, onboard cameras, and network cameras.

The disclosure of Japanese Patent Application No. 2014-172366, filed on Aug. 27, 2014, is incorporated in the application by reference.

While the present invention has been explained with reference to the specific embodiment of the present invention, the explanation is illustrative and the present invention is limited only by the appended claims.

What is claimed is:

1. An imaging lens comprising:
a first lens group having positive refractive power; and
a second lens group having negative refractive power, arranged in this order from an object side to an image plane side,
wherein said first lens group includes a first lens having positive refractive power, a second lens having positive refractive power, and a third lens having negative refractive power,
said second lens group includes a fourth lens having negative refractive power, a fifth lens having negative refractive power, and a sixth lens having positive refractive power,
said first lens is disposed away from the second lens by a distance D12 on an optical axis, and said second lens is disposed away from the third lens by a distance D23 on the optical axis so that the following conditional expression is satisfied:

$3 < D12/D23 < 8$, and
said first lens group has a focal length F1, said first lens has an Abbe's number vd1, said second lens has an Abbe's number vd2, and said third lens has an Abbe's number vd3 so that the following conditional expressions are satisfied:

$0.6 < F1/f < 1.4$, $40 < vd1 < 75$, $40 < vd2 < 75$, $15 < vd3 < 35$, where f is a focal length of a whole lens system.

2. The imaging lens according to claim 1, wherein said first lens has a focal length f1, and said second lens has a focal length f2 so that the following conditional expression is satisfied:

$0.5 < f1/f2 < 5.0$.

3. The imaging lens according to claim 1, wherein said fourth lens and said fifth lens have a composite focal length f45 so that the following conditional expression is satisfied:

$-7.0 < f45/f < -0.5$.

4. The imaging lens according to claim 1, wherein said sixth lens has a focal length f6 so that the following conditional expression is satisfied:

$2 < f6/f < 10$.

5. The imaging lens according to claim 1, wherein said fourth lens and said fifth lens have a composite focal length f45, and said sixth lens has a focal length f6 so that the following conditional expression is satisfied:

$-0.8 < f45/f6 < -0.1$.

6. The imaging lens according to claim 1, wherein said sixth lens has an Abbe's number vd6 so that the following conditional expression is satisfied:

$15 < vd6 < 35$.

* * * * *